(12) United States Patent
Farhadiroushan et al.

(10) Patent No.: US 12,399,040 B2
(45) Date of Patent: Aug. 26, 2025

(54) LONG RANGE OPTICAL FIBER SENSING SYSTEMS

(71) Applicant: Silixa Ltd., Elstree (GB)

(72) Inventors: Mahmoud Farhadiroushan, Elstree (GB); Tom Parker, Elstree (GB); Sergey Shatalin, Elstree (GB); Jack Maxwell, Elstree (GB)

(73) Assignee: Silixa Ltd., Elstree (GB)

( * ) Notice: Subject to any disclaimer, the term of this patent is extended or adjusted under 35 U.S.C. 154(b) by 167 days.

(21) Appl. No.: 17/904,599

(22) PCT Filed: Feb. 19, 2021

(86) PCT No.: PCT/GB2021/050424
§ 371 (c)(1),
(2) Date: Aug. 19, 2022

(87) PCT Pub. No.: WO2021/165700
PCT Pub. Date: Aug. 26, 2021

(65) Prior Publication Data
US 2023/0221151 A1    Jul. 13, 2023

(30) Foreign Application Priority Data

Feb. 21, 2020 (GB) .................................... 2002467
Feb. 21, 2020 (GB) .................................... 2002468
(Continued)

(51) Int. Cl.
*G01D 5/353* (2006.01)
(52) U.S. Cl.
CPC ................ *G01D 5/35364* (2013.01)

(58) Field of Classification Search
CPC .......... G01V 1/226; G01V 1/208; G01V 1/42; G01H 9/004; E21B 47/06; E21B 47/135;
(Continued)

(56) References Cited

U.S. PATENT DOCUMENTS 5,005,936 A * 4/1991 Hsu .................... H04B 10/2589
398/139
5,991,479 A * 11/1999 Kleinerman ....... G01D 5/35358
385/32
(Continued)

FOREIGN PATENT DOCUMENTS

CN         2837791 Y     11/2006
CN       202057344 U     11/2011
(Continued)

OTHER PUBLICATIONS

European Patent Office Partial Search Report for corresponding Application No. EP 24153276.1 mailed Jun. 19, 2024.
(Continued)

*Primary Examiner* — Sang H Nguyen
(74) *Attorney, Agent, or Firm* — Honigman LLP; Matthew H. Szalach

(57) ABSTRACT

A long range optical fiber sensor such as a distributed acoustic sensor has a sensing fiber located remotely from the interrogator, with a length of transport fiber path connecting the two. Because no sensing is performed on the transport fiber then the pulse repetition rate from the interrogator can be high enough such that the pulse repetition rate and pulse power are optimised according to the sensing fiber length and hence sensing frequency response and sensitivity are also optimised according to the sensing fiber length.

4 Claims, 16 Drawing Sheets

(30) Foreign Application Priority Data

| Feb. 21, 2020 | (GB) | ..................................... | 2002470 |
| Feb. 21, 2020 | (GB) | ..................................... | 2002472 |
| Feb. 21, 2020 | (GB) | ..................................... | 2002473 |

(58) Field of Classification Search
CPC .. E21B 47/114; G01K 11/32; G01D 5/35354; G01D 5/35364

See application file for complete search history.

(56) References Cited

U.S. PATENT DOCUMENTS

| 6,630,658 | B1 | 10/2003 | Bohnert et al. |
| 10,072,498 | B2 | 9/2018 | Bhongale et al. |
| 2004/0223715 | A1 | 11/2004 | Benoit et al. |
| 2007/0065075 | A1 | 3/2007 | Berger et al. |
| 2008/0030739 | A1 | 2/2008 | Hartog et al. |
| 2009/0263069 | A1* | 10/2009 | Hartog ............... G01D 5/35358 385/12 |
| 2010/0200744 | A1 | 8/2010 | Pearce et al. |
| 2011/0255077 | A1* | 10/2011 | Rogers ............... G01D 5/35358 356/73.1 |
| 2012/0293806 | A1* | 11/2012 | Cranch ............... G01D 5/35383 374/E13.001 |
| 2013/0113629 | A1* | 5/2013 | Hartog ................... G01V 1/226 340/853.2 |
| 2013/0301978 | A1 | 11/2013 | Meyer et al. |
| 2017/0010385 | A1 | 1/2017 | Englich et al. |
| 2017/0219736 | A1 | 8/2017 | Bhongale et al. |
| 2019/0101419 | A1* | 4/2019 | Rowen .................... H01S 3/302 |
| 2019/0204192 | A1* | 7/2019 | Jaaskelainen ...... G01N 29/2418 |

FOREIGN PATENT DOCUMENTS

| CN | 103364106 | A | 10/2013 |
| CN | 104776870 | A | 7/2015 |
| CN | 105973501 | A | 9/2016 |
| CN | 208921273 | U | 5/2019 |
| CN | 110779682 | A | 2/2020 |
| EP | 2434262 | A1 | 3/2012 |
| EP | 3640618 | A1 | 4/2020 |
| GB | 2341719 | A | 3/2000 |
| GB | 2478915 | A | 9/2011 |
| RU | 2325762 | C2 | 5/2008 |
| WO | WO-2008012498 | A1 | 1/2008 |
| WO | WO-2015030821 | A1 | 3/2015 |
| WO | WO-2015057224 | A1 | 4/2015 |
| WO | WO-2016087850 | A1 | 6/2016 |
| WO | WO-2016142695 | A1 | 9/2016 |
| WO | WO-2017203271 | A1 | 11/2017 |
| WO | WO-2019032339 | A1 | 2/2019 |
| WO | WO-2020097682 | A1 | 5/2020 |
| WO | WO-2020231461 | A1 | 11/2020 |
| WO | WO-2020231462 | A1 | 11/2020 |

OTHER PUBLICATIONS

GB Intellectual Property Office Examination Report for corresponding Application No. GB2213665.9 mailed Mar. 13, 2023.
International Search Report and Written Opinion of corresponding PCT Application No. PCT/GB2021/050424 mailed Jul. 19, 2021.
GB International Property Office Search Report for corresponding Application No. GB2002472.5 mailed Dec. 31, 2020.
GB International Property Office Search Report for corresponding Application No. GB2002470.9 mailed Aug. 21, 2020.
GB International Property Office Search Report for corresponding Application No. GB2002468.3 mailed Aug. 19, 2020.
GB International Property Office Search Report for corresponding Application No. GB2002467.5 mailed Aug. 18, 2020.
GB International Property Office Search Report for corresponding Application No. GB2002473.3 mailed Aug. 18, 2020.
GB Intellectual Property Office Combined Search and Examination Report for corresponding Application No. GB2310774.1 mailed Sep. 28, 2023.
GB Intellectual Property Office Combined Search and Examination Report for corresponding Application No. GB2310780.8 mailed Sep. 28, 2023.
GB Intellectual Property Office Combined Search and Examination Report for corresponding Application No. GB2310782.4 mailed Sep. 27, 2023.
GB Intellectual Property Office Search Report for corresponding Application No. GB2310770.9 mailed Aug. 30, 2023.
Canadian Intellectual Property Office, First Examination Report for Corresponding CA Application No. 3168556 dated Oct. 12, 2023.
European Patent Office Extended Search Report for corresponding Application No. EP 24153276.1 mailed Nov. 14, 2024.

* cited by examiner

LONG RANGE OPTICAL FIBER SENSING SYSTEMS

CROSS-REFERENCE TO RELATED APPLICATIONS

This application claims priority under 35 U.S.C. § 370 to Patent Cooperation Treaty Application No. PCT/GB2021/050424, filed Feb. 19, 2021, which claims the benefit of earlier filed British Application Nos. GB 2002467.5, GB 2002468.3, GB 2002470.9, GB 2002472.5, and GB 2002473.3 filed on Feb. 21, 2020 in the United Kingdom. The entire contents of these applications are incorporated herein by reference in their entirety.

TECHNICAL FIELD

The present invention relates to optical fiber sensing systems, such as optical time domain reflectometers (OTDRs), as well as optical fiber distributed acoustic sensors (DASs), and optical fiber distributed temperature sensors (DTSs). Specifically, the present invention provides for long range optical fiber sensing systems where the optical fiber interrogator is positioned well away from the length of sensing fiber along which sensing measurements are to be made, with at least one length of optical pulse transport fiber in between the sensing fiber and the interrogator.

BACKGROUND TO THE INVENTION AND PRIOR ART

Optical fiber based sensing systems are known already in the art. OTDRs are used to determine fiber condition and properties, such as splice or connector losses and attenuation, whereas DAS and DTS systems use backscatter or reflections from along the fiber to sense acoustic energy incident on the fiber, or ambient temperature around the fiber, as appropriate. An example prior art DAS system is the Silixa® iDAS™ system, available from Silixa Ltd, of Elstree, UK, the details of operation of which are available at the URL http://www.silixa.com/technology/idas/, and which is also described in our earlier patent applications WO2010/0136809 and WO2016/142695, any details of which that are necessary for understanding the present invention being incorporated herein by reference. An example DTS system is the Silixa® Ultima™ system, described at http://www.silixa.com/technology/dts/.

At a high level, DAS and DTS systems operate by sending sensing pulses down an optical fiber deployed in the environment which is to be monitored. For a DAS system the vibrations of an incident acoustic wave on the fiber cause modulations in the backscatter or reflections from the fiber as the pulse travels along the fiber. By measuring the backscatter or reflections and detecting such modulation then the incident acoustic wave can be determined. For a DTS system, ambient temperature affects the amount of backscatter or reflections from different parts of the fiber at different ambient temperatures, so that again temperature along the fiber can be inferred by monitoring the backscatter.

At present most optical fiber DAS and DTS systems are limited in range to around 35 km or so, due to attenuation in the fiber of both of the outward sensing pulse, and the resulting backscatter along the fiber. Specifically, as a sensing pulse travels along the fiber it will decrease in amplitude (and power), such that backscatter from along the fiber from the pulse will consequentially also be of lower amplitude. Given that the backscatter will itself need to travel back along the fiber to the DAS sensor there is a limit to the range of fiber along which a pulse can be sent, and resulting backscatter determined, before the backscatter hits the sensor noise floor. In a typical DAS or DTS scenario, a range of around 35 km would be typical i.e. the DAS or DTS would be able to resolve a signal along approximately 35 km of sensing fiber. However, in many cases there are significant additional optical losses, for example from multiple connectors, which significantly further reduces the maximum range.

For many DAS or DTS sensing applications, a 35 km range is more than adequate. However, for some applications, and particularly security applications such as pipeline security or area security, a greater range would be useful. In addition, in most cases it is desired to maximise the signal to noise ratio over shorter measurement ranges. Whilst range can of course be increased by the provision of several independent systems (i.e. it would be possible to position a DAS box every 35 km along a pipeline), such increases the system deployment cost, and leads to other problems in synchronisation of monitoring of several independent sensor systems of the same type. Our previous patent application WO2016/087850 described an extended range optical fiber sensor, where several lengths of sensing fiber along which sensing measurements are made are joined together in series, with optical amplifiers interspersed along the combined length to maintain the sensing pulses as they travel along the extended length. One downside of having an extended sensing length, however, is that sensor bandwidth is reduced, as the extended length means that the same sensing pulse propagates for longer in the extended length fiber, and hence pulse repetition rate, and hence signal sampling rate, is reduced as ideally only a single pulse should propagate within the length of sensing fiber at once (to allow for ready spatial discrimination of backscatter or reflections from along the fiber).

In some applications, however, it is not necessary to have an extended length of sensing fiber, but the sensing that needs to take place has to take place further from the optical fiber interrogator equipment than the length of a typical sensing fiber. In such a case using an extended length of sensing fiber may in some circumstances be possible, but with the drawback that sensing bandwidth is dramatically reduced, as discussed above. An alternative solution that allows long range optical fiber sensing but with high pulse repetition rates and hence high bandwidth is therefore desirable.

SUMMARY OF INVENTION

The present disclosure presents several different aspects of a long range optical fiber sensor system. In a first aspect a long range optical fiber sensor such as a distributed acoustic sensor has a sensing fiber located remotely from the interrogator, with a length of transport fiber connecting the two. Because no sensing is performed on the transport fiber then the pulse repetition rate from the interrogator can be high enough that multiple pulses travel along the transport fiber at once, and hence sensing bandwidth is increased. In one embodiment separate forward and return lengths of transport fiber can be provided. In another embodiment the transport fiber can be a combination of high power fiber and ultra low loss fiber. This allows significantly higher energy sensing pulses to be injected into the fiber by the interrogator, and helps to maintain the pulse energy whilst it traverses the transport fiber to the sensing fiber.

In further embodiments fiber amplifiers such as erbium doped fiber amplifiers may be included in line in the transport fiber, typically located just before the sensing fiber in the direction of pulse travel from the interrogator. Doped fiber pump sources inject pump light onto the transport fiber at a different wavelength from the interrogator to power the fiber amplifiers.

In yet further embodiments at least one Raman pump source can be provided to inject light pulses at a Raman pump wavelength to stimulate the generation of signal photons at the interrogator pulse wavelength via the stimulated Raman scattering (SRS) phenomenon. Where there are separate forward and return paths for the transport fiber then respective Raman pump pulses can be injected onto each path. The stimulated Raman scattering that is thus induced in the fiber helps to maintain the power of the sensing pulses as they travel along the transport fiber to the sensing fiber. In one embodiment respective Raman pump sources may be provided for each of the forward and return transport fibers. In addition, the Raman pump source for the forward path may operate in pulsed mode, whereas the Raman pump source for the return path may operate in CW mode. In a further embodiment, gratings, or other wavelength-selective reflectors, which reflect at the Raman pump wavelength may be provided in the transport fiber(s) at or towards the sensing fiber end in order to reflect any unused Raman pump light back along the transport fiber, and thereby improve SRS efficiency. The use of reflecting the pump wavelength is particular important for amplification of the sensing pulse, as this allows the sensing pulse and pump light to counter-propagate such that the sensing pulse can be amplified along the fibre without inducing significant depletion of the pump light, which occurs in the case of co-propagating sensing pulse and pump light.

In view of the above from one aspect there is provided a long range optical fiber distributed sensor system, comprising: an optical source arranged in use to produce optical sensing pulses; a sensing optical fiber deployable in use in an environment to be sensed and arranged in use to receive the optical sensing pulses; and sensing apparatus arranged in use to detect light from the optical sensing pulses reflected and/or backscattered back along the sensing optical fiber and to determine any one or more of an acoustic, vibration, temperature or other parameter that perturbs the path length of the sensing optical fiber in dependence on the reflected and/or backscattered light; the system being characterised by: at least one transport fiber path arranged between the sensing optical fiber and the optical source to transport the optical sensing pulses from the optical source to the sensing fiber and to transport backscatter and/or reflections from along the sensing fiber back to the sensing apparatus; wherein the optical source is controlled to produce optical sensing pulses at a pulse repetition rate that is dependent on the length of the sensing optical fiber and not the length of the transport fiber.

In one example the transport fiber is longer than the sensing optical fiber and the optical sensing pulse repetition rate is such that a plurality of optical sensing pulses propagate along the transport fiber towards the sensing optical fiber simultaneously. This allows a high pulse rate and hence high sensing bandwidth to be obtained over long range. In one example the pulse repetition rate is set at a rate such that a single optical sensing pulse propagates in the sensing optical fiber at any one time.

In one example the transport fiber comprises a forward transport fiber arranged to convey optical sensing pulses from the optical source to the sensing optical fiber, and a return transport fiber arranged to convey back scatter and/or reflections from the sensing optical fiber back to the interrogator.

In one example the forward transport fiber path comprises at least a first part formed of high power handling fiber. This helps to maintain the power of the optical sensing fiber as they traverse the transport fiber segment.

In the above example the forward transport fiber may further comprise a second part formed of low loss fiber, the first and second parts being arranged in series. More particularly, the respective lengths of the first parts and the second parts may be determined in dependence on the respective nonlinear threshold of the high power handling fiber and the low loss fiber. This helps to ensure the most efficient split between high power handling fiber and low loss fiber on the forward transport path.

In particular, in one embodiment the high power handling fiber has a higher loss rate than the low loss fiber, and the length of the first part corresponds to a length of high power fiber that for an input optical sensing pulse of a first power propagates that pulse until it reaches the same power level as would have been achieved had low loss fiber been used for the first part with the input optical sensing pulse being of a second power lower than the first power, the first and second power levels being those power levels such that pulse propagation would occur in the respective fiber types without causing non-linear distortion effects.

Another example of the present disclosure provides a long range optical fiber distributed sensor system, comprising: an optical source arranged in use to produce optical sensing pulses; a sensing optical fiber deployable in use in an environment to be sensed and arranged in use to receive the optical sensing pulses; and sensing apparatus arranged in use to detect light from the optical sensing pulses reflected and/or backscattered back along the sensing optical fiber and to determine any one or more of an acoustic, vibration, temperature or other parameter that perturbs the path length of the sensing optical fiber in dependence on the reflected and/or backscattered light; the system being characterised by: at least one transport fiber arranged between the sensing optical fiber and the optical source to transport the optical sensing pulses from the optical source to the sensing fiber and to transport backscatter and/or reflections from along the sensing fiber back to the sensing apparatus; wherein the transport fiber comprises a forward transport fiber arranged to convey optical sensing pulses from the optical source to the sensing optical fiber, and a return transport fiber arranged to convey back scatter and/or reflections from the sensing optical fiber back to the interrogator; wherein the forward transport fiber comprises at least a first part formed of high power handling fiber and a second part formed of low loss fiber, the first and second parts being arranged in series.

In one example the respective lengths of the first parts and the second parts are determined in dependence on the respective loss rates of the high power fiber and the low loss fiber. More particularly, in a further example the high power handling fiber has a higher loss rate than the low loss fiber, and the length of the first part corresponds to a length of high power fiber that for an input optical sensing pulse of a first power propagates that pulse until it reaches the same power level as would have been achieved had low loss fiber been used for the first part with the input optical sensing pulse being of a second power lower than the first power, the first and second power levels being those power levels such that pulse propagation would occur in the respective fiber types without causing non-linear distortion effects.

In a further example an optical fiber amplifier is provided arranged in series with the transport fiber, and an optical fiber amplifier pump source arranged to provide pump light to the optical fiber amplifier, the optical fiber amplifier arranged in use to amplify the forward optical sensing pulses and/or the returning backscatter and/or reflections.

In a yet further example a separate optical fiber amplifier is provided on each of the forward and return transport fibers. In particular, a respective optical fiber amplifier pump source is provided for the respective optical fiber amplifiers, wherein the pump source for the optical fiber amplifier on the return transport fiber provides a continuous wave pump signal, and the pump source for the optical fiber amplifier on the forward transport fiber provides a pulsed pump signal that co-propagates with the forward optical sensing pulses.

A further example further comprises a Raman pump light source arranged to provide Raman pump light into the transport fiber, the Raman pump light being arranged to interact with the optical sensing pulses and/or the reflections and/or backscatter from the sensing optical fiber to increase the power of the optical sensing pulses and/or the reflections and/or backscatter.

In particular in one example a separate Raman pump light source is provided for each of the forward and return transport fibers.

In one example the Raman pump light source for the return transport fiber provides a continuous wave pump signal, and the Raman pump light source for the forward transport fiber provides a continuous Raman pump signal a part of which co-propagates with the forward optical sensing pulses.

Another example further comprises at least one wavelength selective reflector component located in the forward transport fiber and arranged to reflect Raman pump light back towards the sensing apparatus. In this example the reflected continuous wave Raman pump signal counter propagates against the optical sensing pulses such that they present at the Raman stimulation wavelength an undepleted part of the Raman pump signal, which stimulates emission at the optical sensing pulse wavelength.

A yet further example further comprises at least one wavelength selective reflector component located in the return transport fiber and arranged to reflect Raman pump light back towards the sensing apparatus. In this example the reflected continuous Raman pump signal co-propagates with the returning backscatter and/or reflections from the optical sensing fiber and stimulates emission at the returning backscatter and/or reflections wavelength.

Yet another example of the present disclosure provides a long range optical fiber distributed sensor system, comprising: an optical source arranged in use to produce optical sensing pulses; a sensing optical fiber deployable in use in an environment to be sensed and arranged in use to receive the optical sensing pulses; and sensing apparatus arranged in use to detect light from the optical sensing pulses reflected and/or backscattered back along the sensing optical fiber and to determine any one or more of an acoustic, vibration, temperature or other parameter that perturbs the path length of the sensing optical fiber in dependence on the reflected and/or backscattered light; the system being characterised by: at least one transport fiber arranged between the sensing optical fiber and the optical source to transport the optical sensing pulses from the optical source to the sensing fiber and to transport backscatter and/or reflections from along the sensing fiber back to the sensing apparatus; at least one optical fiber amplifier arranged in series with the transport fiber, and; an optical fiber amplifier pump source arranged to provide pump light to the optical fiber amplifier, the optical fiber amplifier arranged in use to amplify at least one of: i) the forward optical sensing pulses; or ii) the forward optical sensing pulses and the returning backscatter and/or reflections.

In one example the transport fiber comprises a forward transport fiber arranged to convey optical sensing pulses from the optical source to the sensing optical fiber, and a return transport fiber arranged to convey back scatter and/or reflections from the sensing optical fiber back to the interrogator.

In some examples a separate optical fiber amplifier is provided on each of the forward and return transport fibers. In particular in some examples a respective optical fiber amplifier pump source is provided for the respective optical fiber amplifiers, wherein the pump source for the optical fiber amplifier on the return transport fiber provides a continuous wave pump signal, whereas the pump source for the optical fiber amplifier on the forward transport fiber provides a pulsed pump signal that co-propagates with the forward optical sensing pulses.

In further examples a Raman pump light source is arranged to provide Raman pump light into the transport fiber, the Raman pump light being arranged to interact with the optical sensing pulses and/or the reflections and/or backscatter from the sensing optical fiber to increase the power of the optical sensing pulses and/or the reflections and/or backscatter.

In some examples of the above, a separate Raman pump light source is provided for each of the forward and return transport fibers. In particular examples the Raman pump light source for the return transport fiber provides a continuous wave pump signal, and the Raman pump light source for the forward transport fiber provides a continuous Raman pump signal a part of which co-propagates with the forward optical sensing pulses.

In some further examples at least one wavelength selective reflector component is provided located in the forward transport fiber and arranged to reflect Raman pump light back towards the sensing apparatus. In such examples the reflected continuous wave Raman pump signal counter propagates against the optical sensing pulses such that it presents at the Raman stimulation wavelength an undepleted part of the Raman pump signal, which stimulates emission at the optical sensing pulse wavelength.

In further examples at least one wavelength selective reflector component is located in the return transport fiber and arranged to reflect Raman pump light back towards the sensing apparatus. In such examples the reflected continuous Raman pump signal co-propagates with the returning backscatter and/or reflections from the optical sensing fiber and stimulates emission at the returning backscatter and/or reflections wavelength.

In further examples a wavelength division multiplexer is provided on each of the forward and return transport fibers, the wavelength division multiplexers being arranged to select the Raman pump light travelling on the respective forward and return transport fibers, and direct it back down the fibers towards the Raman pump source(s).

In such examples the Raman pump light from the forward transport fiber is directed via the WDM into the return transport fiber, and vice versa.

In particular, the Raman pump light from the forward transport fiber is directed via the WDM to a reflector which reflects it back into the WDM and then back down the forward transport fiber.

In addition, the Raman pump light from the return transport fiber is directed via the WDM to a reflector which reflects it back into the WDM and then back down the return transport fiber.

Yet another example of the present disclosure provides a long range optical fiber distributed sensor system, comprising: an optical source arranged in use to produce optical sensing pulses; a sensing optical fiber deployable in use in an environment to be sensed and arranged in use to receive the optical sensing pulses; and sensing apparatus arranged in use to detect light from the optical sensing pulses reflected and/or backscattered back along the sensing optical fiber and to determine any one or more of an acoustic, vibration, temperature or other parameter that perturbs the path length of the sensing optical fiber in dependence on the reflected and/or backscattered light; the system being characterised by: at least one transport fiber arranged between the sensing optical fiber and the optical source to transport the optical sensing pulses from the optical source to the sensing fiber and to transport backscatter and/or reflections from along the sensing fiber back to the sensing apparatus; and a Raman pump light source arranged to provide Raman pump light into the transport fiber, the Raman pump light being arranged to interact with the optical sensing pulses and/or the reflections and/or backscatter from the sensing optical fiber to increase the power of the optical sensing pulses and/or the reflections and/or backscatter; wherein the transport fiber comprises a forward transport fiber arranged to convey optical sensing pulses from the optical source to the sensing optical fiber, and a return transport fiber arranged to convey back scatter and/or reflections from the sensing optical fiber back to the interrogator; and wherein a separate Raman pump light source is provided for each of the forward and return transport fibers.

In one example the Raman pump light source for the return transport fiber provides a continuous wave pump signal, and the Raman pump light source for the forward transport fiber provides a continuous Raman pump signal a part of which co-propagates with the forward optical sensing pulses.

A further example further comprises at least one wavelength selective reflector component located in the forward transport fiber and arranged to reflect Raman pump light back towards the sensing apparatus.

In the above example the reflected continuous wave Raman pump signal counter propagates against the optical sensing pulses so as to present at the Raman stimulation wavelength an undepleted part of the Raman pump signal, which stimulates emission at the optical sensing pulse wavelength.

A further example may further comprise at least one wavelength selective reflector component located in the return transport fiber and arranged to reflect Raman pump light back towards the sensing apparatus.

Within the above the reflected continuous Raman pump signal co-propagates with the returning backscatter and/or reflections from the optical sensing fiber and stimulates emission at the returning backscatter and/or reflections wavelength.

A further example may further comprise a wavelength division multiplexer on each of the forward and return transport fibers, the wavelength division multiplexers being arranged to select the Raman pump light travelling on the respective forward and return transport fibers, and direct it back down the fibers towards the Raman pump source(s).

In one example the Raman pump light from the forward transport fiber is directed via the WDM into the return transport fiber, and vice versa, whereas in another example the Raman pump light from the forward transport fiber is directed via the WDM to a reflector which reflects it back into the WDM and then back down the forward transport fiber.

In a further example the Raman pump light from the return transport fiber is directed via the WDM to a reflector which reflects it back into the WDM and then back down the return transport fiber.

A yet further example of the present disclosure provides a long range optical fiber distributed sensor system, comprising: an optical source arranged in use to produce optical sensing pulses; a sensing optical fiber deployable in use in an environment to be sensed and arranged in use to receive the optical sensing pulses; and sensing apparatus arranged in use to detect light from the optical sensing pulses reflected and/or backscattered back along the sensing optical fiber and to determine any one or more of an acoustic, vibration, temperature or other parameter that perturbs the path length of the sensing optical fiber in dependence on the reflected and/or backscattered light; the system being characterised by: at least one transport fiber arranged between the sensing optical fiber and the optical source to transport the optical sensing pulses from the optical source to the sensing fiber and to transport backscatter and/or reflections from along the sensing fiber back to the sensing apparatus; and a Raman pump light source arranged to provide Raman pump light into the transport fiber, the Raman pump light being arranged to interact with the optical sensing pulses and/or the reflections and/or backscatter from the sensing optical fiber to increase the power of the optical sensing pulses and/or the reflections and/or backscatter; and at least one wavelength selective reflector component located in the transport fiber and arranged to reflect Raman pump light back towards the sensing apparatus.

In one example the transport fiber comprises a forward transport fiber arranged to convey optical sensing pulses from the optical source to the sensing optical fiber, and a return transport fiber arranged to convey back scatter and/or reflections from the sensing optical fiber back to the interrogator; wherein a separate Raman pump light source is provided for each of the forward and return transport fibers.

In one example the Raman pump light source for the return transport fiber provides a continuous wave pump signal, and the Raman pump light source for the forward transport fiber provides a continuous Raman pump signal a part of which co-propagates with the forward optical sensing pulses.

In particular, in one example the continuous Raman pump signals reflected from the reflector component counter propagate against the optical sensing pulses and stimulate emission at the optical sensing pulse wavelength.

Another example further comprises at least one wavelength selective reflector component located in the return transport fiber and arranged to reflect Raman pump light back towards the sensing apparatus.

In this example, the reflected continuous Raman pump signals co-propagate with the returning backscatter and/or reflections from the optical sensing fiber and stimulate emission at the returning backscatter and/or reflections wavelength.

Another example further comprises a wavelength division multiplexer on each of the forward and return transport fibers, the wavelength division multiplexers being arranged to select the Raman pump light travelling on the respective forward and return transport fibers, and direct it back down the fibers towards the Raman pump source(s).

In one variant of the above the Raman pump light from the forward transport fiber is directed via the WDM into the return transport fiber, and vice versa.

In another variant of the above the Raman pump light from the forward transport fiber is directed via the WDM to a reflector which reflects it back into the WDM and then back down the forward transport fiber.

In particular, in one variant the Raman pump light from the return transport fiber is directed via the WDM to a reflector which reflects it back into the WDM and then back down the return transport fiber.

Further features and aspects of the invention will be apparent from the appended claims.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein:

FIG. 16 is a diagram illustrating a third modification that may be made to examples of the present disclosure;

DESCRIPTION OF THE EMBODIMENTS

Figure 1:
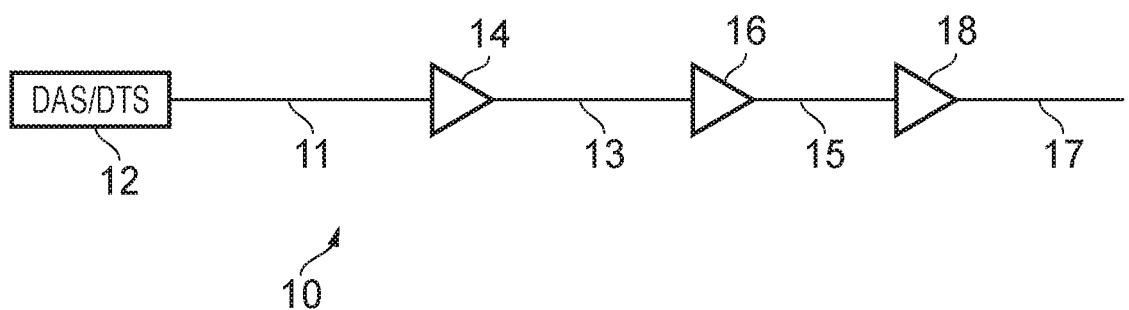
FIG. 1 is an example extended range DAS system of the prior art.

The present disclosure presents several different examples of a long range optical fiber sensor system. In a first example a long range optical fiber sensor such as a distributed acoustic sensor comprises an optical fiber interrogator to generate pulses to be injected onto the sensing fiber and to receive and process backscatter and/or reflections from along the sensing fiber to determine perturbations caused by acoustic or other vibrational energy incident on the fiber. The sensing fiber is located remote from the interrogator, however, and is not connected directly thereto, instead being located in a geographic region of interest from which measurements are to be taken, for example in a subsea well in a hydrocarbon or carbon dioxide sequestration field, the region of interest being remote from the location of the interrogator. For example, the technique can be employed in situations where the region or asset to be monitored are on land but required to be remote from the interrogator, for example due to environmental conditions or power requirements. The sensing fiber may be used to conduct seismic surveys on the sensing fiber, or to undertake condition monitoring of an asset.

In order to connect the interrogator to the sensing fiber, at least one length of transport fiber is disposed between the interrogator and the sensing fiber, arranged to receive sensing pulses from the interrogator and to transport them and inject them into the sensing fiber. A separate length of transport fiber may be used for the forward and return paths, such that the forward pulses travel from the interrogator to the sensing fiber along a first, forward, length of transport fiber, and then the backscatter and reflections from along the sensing fiber return to the interrogator along a separate return length of transport fiber. Because there is no sensing to be performed from along the lengths of transport fiber then the pulse repetition rate of pulses generated by the interrogator can be at a frequency such that only one pulse is travelling along the sensing fiber at once, but where the transport fiber is longer than the sensing fiber then multiple pulses may be travelling along the transport fiber, separated at least by the pulse propagation time along only the sensing fiber. As such, pulse repetition rate, and hence sensing bandwidth is increased. Further details will be described later with respect to FIG. 2.

In another example the transport fiber on the forward path from the interrogator to the sensing fiber is a combination of high power fiber (HPF) and ultra low loss (ULL) fiber, with the point at which the fiber is changed from high power fiber to ultra low loss fiber being dependent on the respective loss rates and the length of the transport fiber. In this regard, high power fiber (such as Corning® Metrocor® fiber available from Corning Inc, NY, USA) allows significantly more light to be launched before the onset of non-linear effects (which distort the signal) than is possible with standard fibre. Roughly, it is optimum for the first ~50 km of the transport fiber to be of this high power type. High power fiber such as Metrocor® fiber typically has a higher loss than standard fibre (Metrocor® has a 0.20 dB/km cf 0.18 dB/km for standard fiber), but the high power handling properties more than compensate for this at the beginning where the optical power is highest. Low loss fibre is then used for remainder of the umbilical optical path. Corning® SMF-28® ULL is an example fibre (which has losses of about ~0.16 dB/km). Further details will be described later with respect to FIGS. 3 and 4.

In a further example which may be combined with either of the above two examples, optical fiber amplifiers are placed in line in the forward and/or return paths to amplify the outward bound sensing pulses and/or returning signal. In addition, doped fiber pump sources (DPFS) are further provided, to provide pump optical energy to power the fiber amplifiers. Further details will be described later with respect to FIG. 5.

In a yet further example which may be combined with any of the above examples, Raman pump sources may be provided to inject Raman pump light onto the forward and/or return paths of the transport fiber(s). The Raman pump light on the forward path may be continuous or pulsed and synchronised with the sensing pulses so as to co-propagate along the transport fiber therewith. The Raman pump light on the return path may be continuous so as to stimulate the pseudo continuous reflections and backscatter travelling back to the interrogator. The Raman pump light acts via the process of stimulated Raman scattering to help maintain the power of the sensing pulses as they travel along the transport fiber in the forward direction to the sensing fiber, and also to help maintain the power of the backscatter and reflections as they travel back along the transport fiber on the return path to the interrogator.

In some examples that use Raman pump light for amplification, filters to filter out any excess Raman pump light may be provided at the far end of the transport fiber where the transport fiber is connected (usually via an optical circulator) to the sensing fiber. This prevents any unused Raman pump light from entering the optical circulator and components downstream thereof (including any amplifiers that may be included in the signal path) and potentially overloading those components and thereby causing damage.

In a further variant of the above example, either or both of the forward and return paths may be provided with a Bragg grating, or other wavelength selective reflector, which reflects the continuous wave Raman pump light back along the transport fiber towards the pump source. On the outbound path this causes sensing pulses to co-propagate with the section of the continuous Raman light, drawing power from that part of the Raman pump light, whilst at the same time counter propagating against earlier emitted Raman pump light which has been reflected back from the grating. When deployed downhole, the use of a pump wavelength reflector also provides a protection for a wellhead wet-mat connector as it cuts off the pump power reaching the connector termination end, thus avoiding potential connector damage. Further details will be described below with respect to FIGS. 8 to 13.

Figure 2:
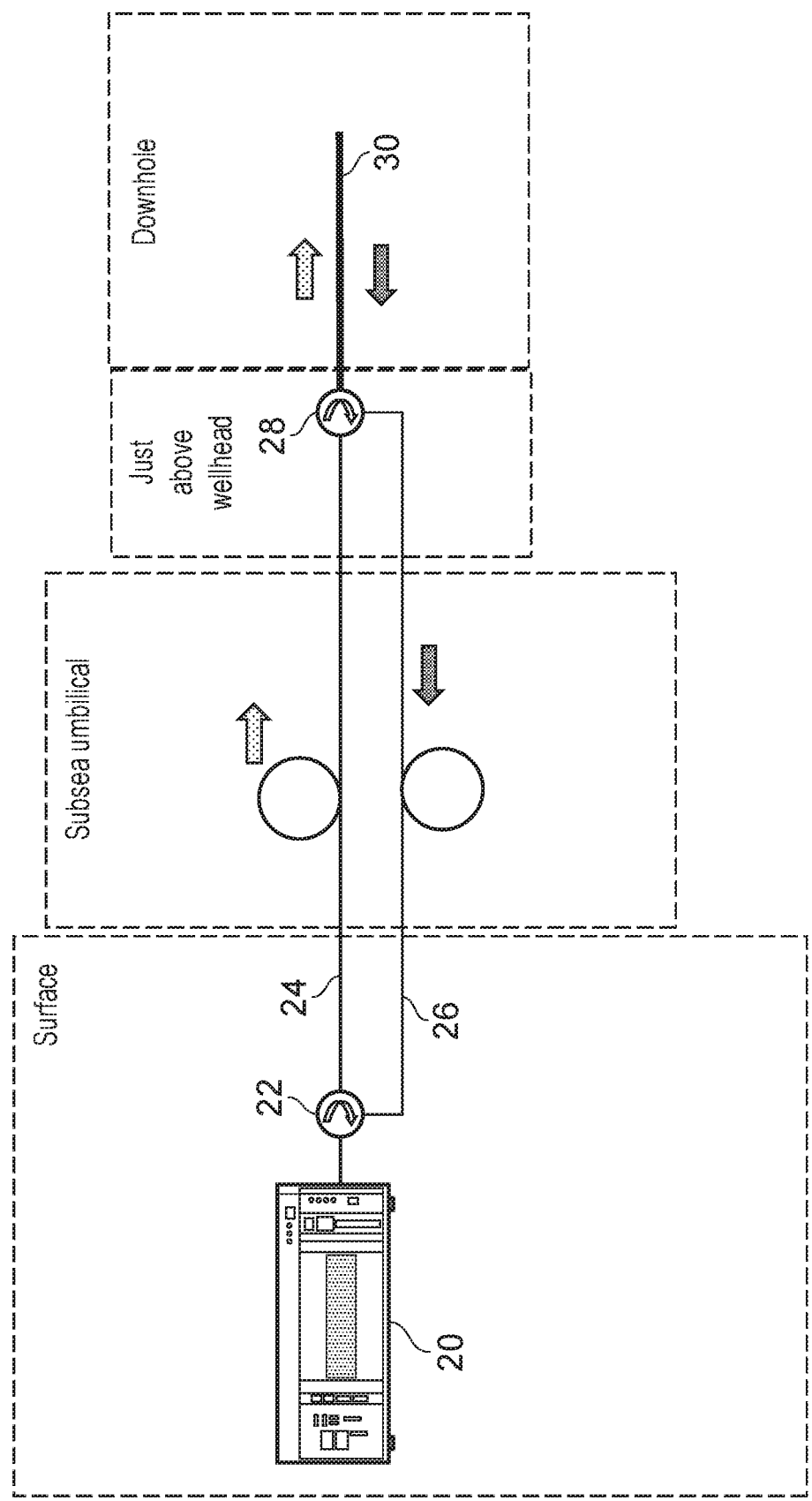
FIG. 2 is a diagram of a first example of the present disclosure.

Turning now to the specific examples to be described, FIG. 2 shows a first embodiment, wherein an optical fiber sensor interrogator 20, which may be an optical fiber distributed acoustic sensor such as a Silixa® iDAS™ or the like, available from Silixa Ltd, Hertfordshire, UK, is provided, having an output port on which sensing pulses are output to an optical fiber, which is connected to the first port of a first optical circulator 22. A second port of the optical circulator 22 has connected to it an outward optical fiber 24, to act as the outward path of the transport fiber, which transports pulses from the interrogator 20 to a first port of a second optical circulator 28. Connected to a second port of the second optical circulator 28 is the sensing fiber 30, which is deployed within the environment in which sensing is to be undertaken. The sensing fiber may be provided with weak reflectors along its length, as described in our earlier patent application no. WO2016/142695.

The optical fiber sensor may be an optical fiber distributed acoustic sensor (DAS) or an optical fiber distributed temperature sensor (DTS). In particular, where the sensor is a DAS, it may be a DAS sensor of the type described in our earlier application WO2016/142695 which makes use of a sensing optical fiber having very weak reflectors distributed along its length at the desired sensing spatial resolution. As explained in WO2016/142695, the number of reflectors is inversely related to the reflectivity of the reflectors, for a given acceptable level of cross-talk, in that more reflector points can be provided when the reflectivity of the reflector points is lower. Moreover, for a given number of reflectors, the reflectivity of those reflectors is also related to the desired or allowable cross-talk, in that if a higher cross-talk is acceptable, then a higher reflectivity can be used. Thus, when specifying a fiber for a particular application, the number of sensing points can first be specified, based on the sensing length of the fiber (i.e. the length over which sensing needs to take place), and the desired spatial resolution which in turn defines the spacing between the reflectors. Then, having determined the number of reflectors needed (in dependence on the desired length of fiber over which sensing needs to take place and the desired spatial resolution over that length), an acceptable level of cross-talk can then be specified, which in turn then allows the reflectivity of the reflectors to be determined, in accordance with the graphed functions shown in FIGS. 35 and 36 of WO2016/142695, which are explicitly incorporated herein by reference.

Reflections and backscatter from along the sensing fiber, and caused by the sensing pulses travelling along the sensing fiber in the outbound direction, travel back to the second port of the second optical circulator 28, and are then directed out of a third port of the second optical circulator 28, onto a return part of the transport fiber, for example a return fiber 26. The return fiber 26 then transports the reflections and backscatter back to the first optical circulator 22, and is connected to a third port of the first optical circulator 22, and then directed back out of the first port of the first optical circulator 22, to be input back into the interrogator 20. Within the interrogator the backscatter and reflections can be processed as known in the art and as described in our earlier patent applications WO2010/0136809 and WO2016/142695 to determine any acoustic signal at the sensing resolution for each part of the optical sensing fiber. That is, the interrogator will have a spatial sensing resolution, referred to as the gauge length, typically, 10 m, or 5 m, but in some cases as low as 1 m, and an acoustic signal can be resolved from each contiguous length of sensing fiber corresponding to the gauge length.

The output stage of the interrogator usually contains an optical circulator and, if wished, the interrogator could be configured to have the internal optical circulator removed such that the interrogator has two optical connections; one for the outbound optical path and one for the return optical path. In this case, optical circulator 22 is not required, with optical circulator 28 then performing the function of the internal circulator, which has been removed. This arrangement has the advantage of removing two optical circulators, with the associated optical losses.

In use the interrogator outputs sensing pulses to the optical circulator 22, the sensing pulses travel along the outbound transport fiber 24, and are directed via the second optical circulator 28 into the sensing fiber. Reflections and backscatter from along the sensing fiber are then directed via the second optical circulator 28 onto the return transport fiber 26, which then carries them to the third port of the first optical circulator 22, which then outputs them back into the interrogator for processing.

As shown in the Figure, in this example the sensing fiber may be located well away from the interrogator 20, for example downhole in a subsea well, with the second optical circulator being located at the wellhead. The transport fiber 24, 26 is then contained within a subsea umbilical cable, which may stretch for many kilometres, for example up to or over 50 km. This umbilical cable then connects into the interrogator, which is maintained at the surface, for example on a surface vessel or rig. With such an arrangement, therefore, long-range sensing can be provided, at significant distances from the interrogator.

In terms of the operation of the interrogator, because no sensing is being performed along the transport fiber(s) and only along the length of the sensing fiber, then the sensing pulse repetition rate can be set in dependence only on the length of the sensing fiber, and not on the total length of the sensing fiber and the transport fiber. In this respect, for proper sensing there should be a single sensing pulse in the sensing fiber at once, so that it is clear from where along the fiber reflections and backscatter are being received. However, where the sensing fiber is much shorter than the transport fiber then multiple sensing pulses may be propagating along different parts of the transport fiber to the sensing fiber at the same time, separated by at least the length of the sensing fiber (allowing for the same propagation speed in the transport fiber and the sensing fiber). This allows the pulse repetition rate to be maintained at the same rate as if the sensing fiber was directly connected to the interrogator, and hence the sensing bandwidth of the whole sensor system is maintained. This is a significant difference from the arrangement described in our previous WO2016/087850, where the sensing bandwidth was much reduced by treating the whole extended fiber length as sensing fiber. Quantitatively, where the transport fiber is x times the length of the sensing fiber, then a train of up to x pulses may travel in the transport fiber simultaneously, separated by the sensing fiber length.

Figure 3:
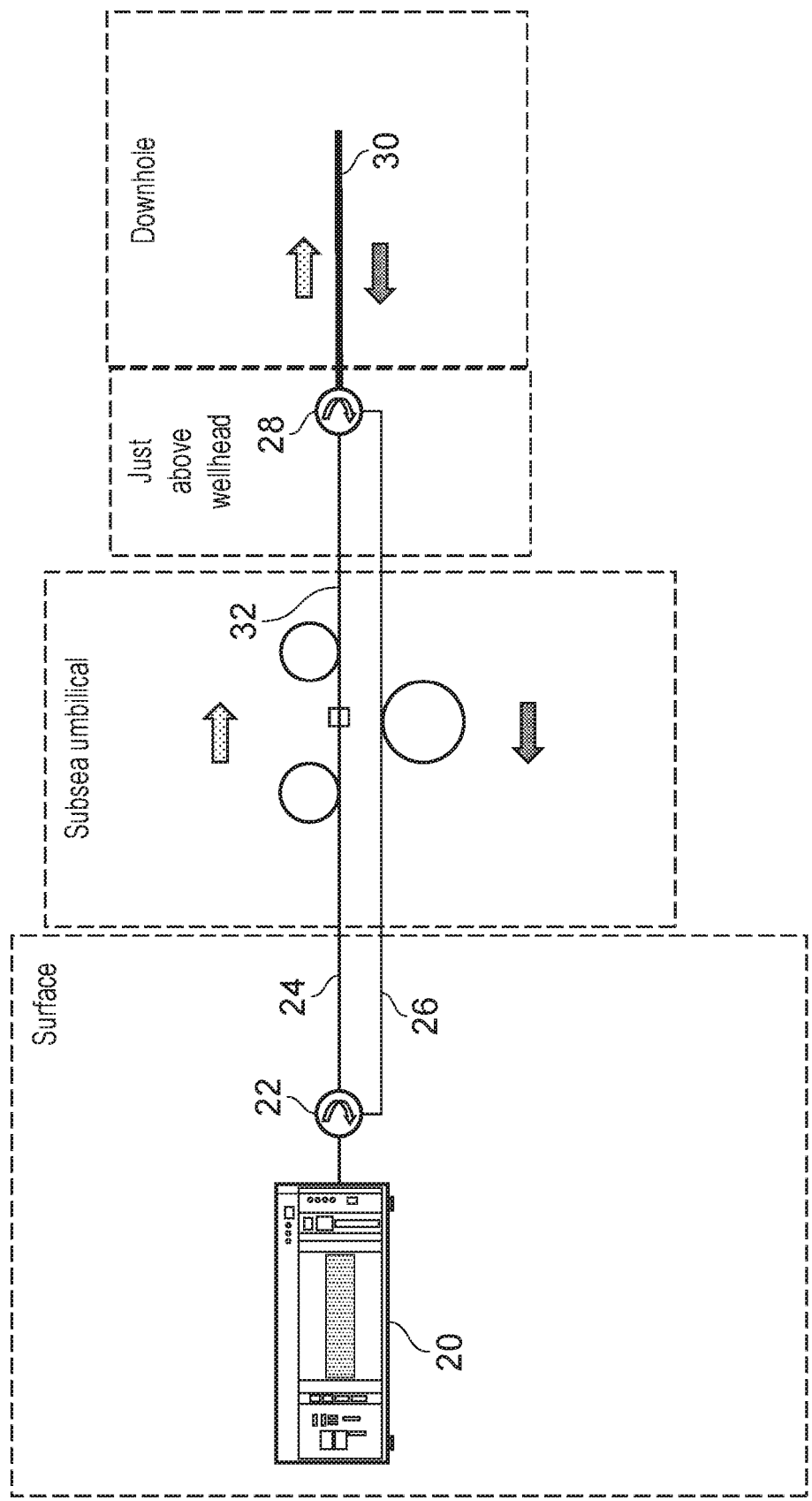
FIG. 3 is a diagram of a second example of the present disclosure.

FIG. 3 shows a further example, which is based on the above example, and hence corresponding parts will not be described again. In this example, however, the outbound transport fiber is split into two parts, with a first part 24 being formed from high power fiber (HPF), and a second part 32 being formed from ultra low loss (ULL) fiber 32. As mentioned previously, and as discussed further below, the use of high power fiber as the first part of the outbound transport fiber allows a higher power pulse to be injected into the transport fiber without non-linear distortion effects being induced, which in turn leads to a higher power pulse being injected into the sensing fiber, and hence higher signal to noise ratio being obtained.

The return transport fiber 26 is all ultra low loss fiber, as in use this fiber carries the backscatter and reflections from the sensing fiber, which by definition are low power.

Figure 4:
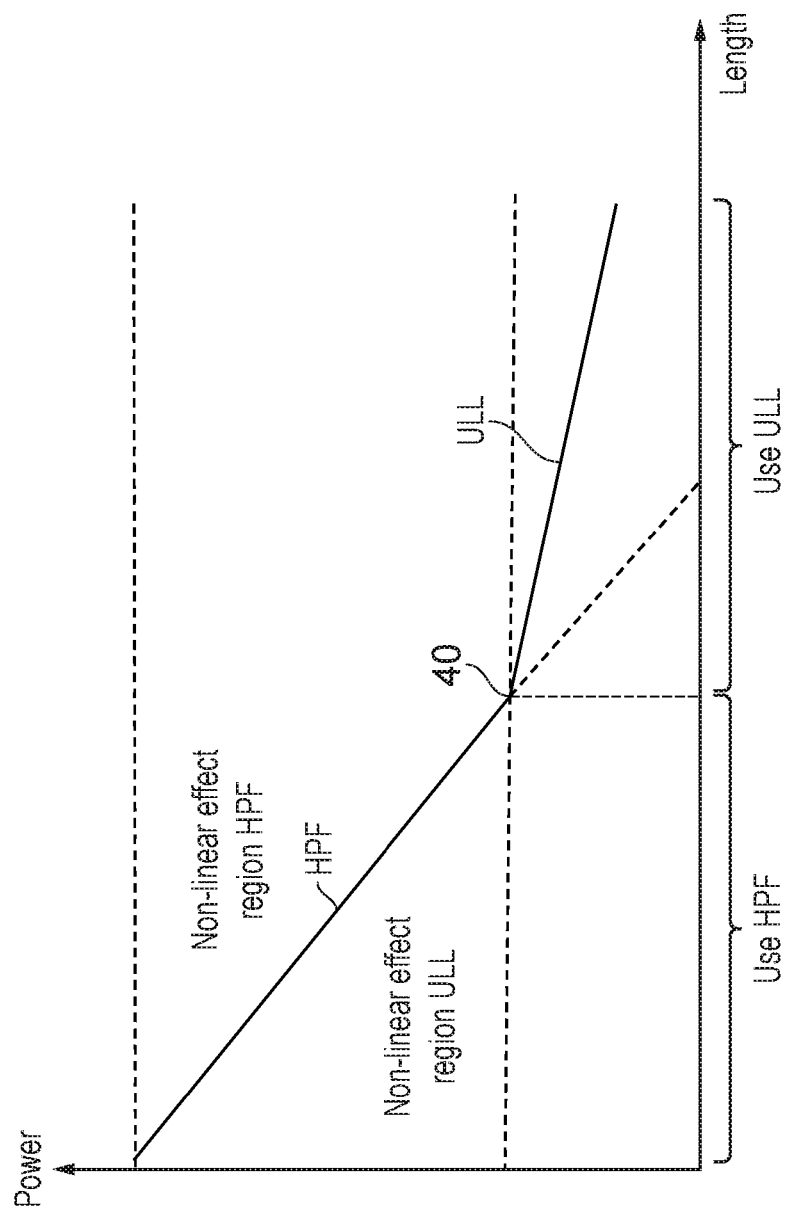
FIG. 4 is a chart illustrating a property of the second example of the present disclosure.

In terms of where the switch-over from HPF to ULL fiber should take place on the forward transport fiber, this should be the point where the power level has reached the non-linear threshold level for the following length of ULL fiber. FIG. 4 illustrates the principle in further detail, and shows respective loss rates (not to scale) of HPF and ULL fiber respectively, represented by the gradients of each power curve. The nonlinear threshold power for the HPF and ULL fibers are shown by the horizontal dotted lines, the HPF fiber having a higher non-linear threshold than the ULL fiber.

As shown further by FIG. 4, using HPF as the first part of the transport fiber path on the outward path to the sensing fiber from the interrogator means that a higher power pulse can be injected onto the fiber, without inducing non-linear distortion. However, due to the higher loss per km of the HPF there will be a crossover point 40, depending on the total length of the transport fiber path, where if HPF was continued beyond that point the pulse signal power delivered into the sensing fiber would be lower than if HPF fiber had not been used at all. From this crossover point, therefore, it is then beneficial to use ULL fiber, to minimise further losses in the transport fiber. However, if the length of the transport fiber is such that HPF fiber can be used for all of its length i.e. is shorter than the length of the crossover point, then the use of HPF will allow sensing pulses of greater power to be delivered into the sensing fiber than if ULL or standard fiber had been used for the entire length of the transport fiber path.

Effectively, the use of HPF and a higher power injected pulse can compensate for the attenuation of the HPF section of the transport fiber path (depending on the length of transport fiber, and the loss rate of the HPF), and deliver optimum pulse power to the sensing fiber to the limits as if the sensing fiber is directly connected to the interrogator.

Figure 5:
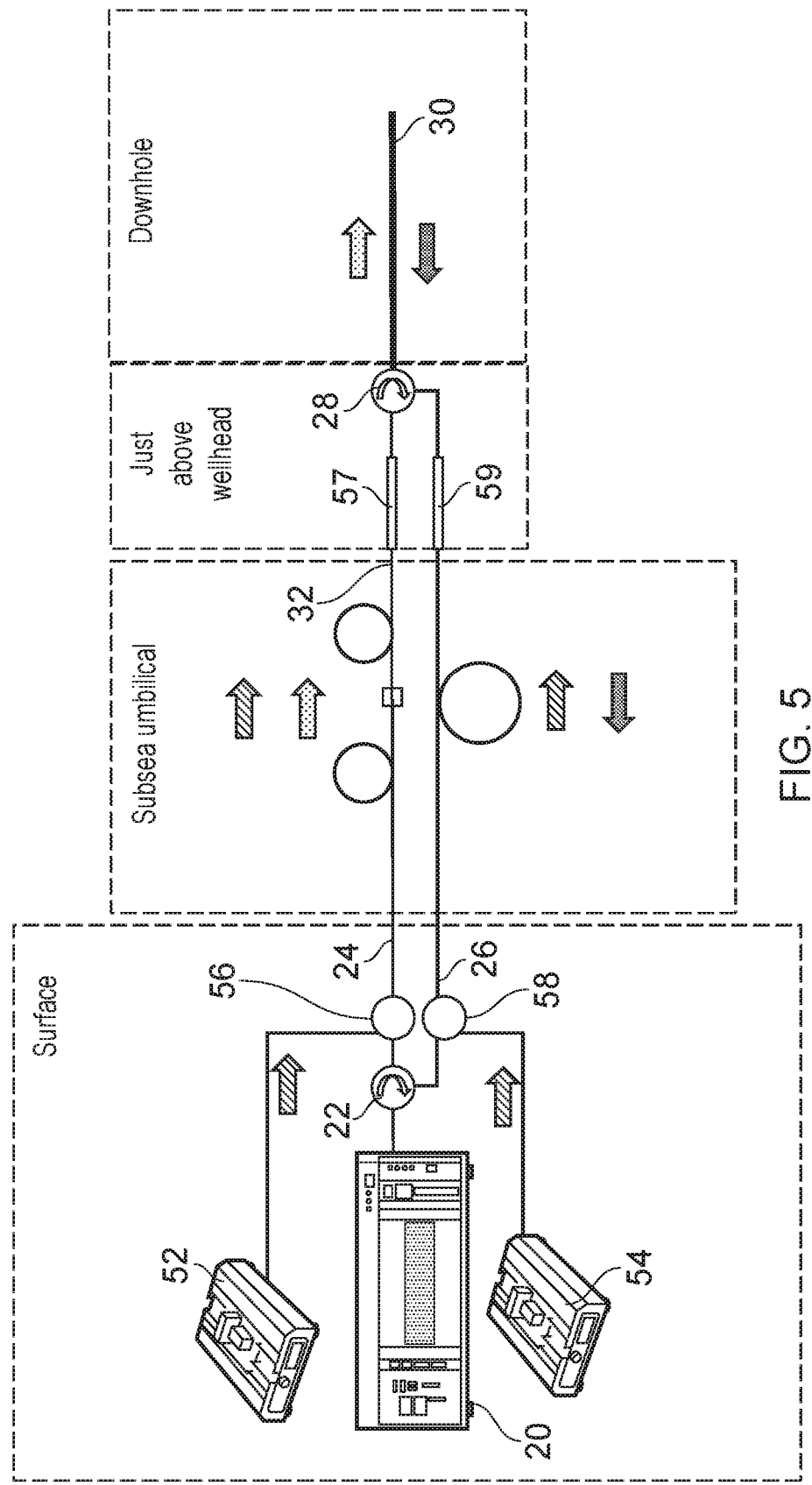
FIG. 5 is a diagram of a third example of the present disclosure.

Turning now to FIG. 5, another example is shown. Here the example of FIG. 5 builds upon the example of FIG. 4, but adds in at least one optical fiber amplifier into at least one of the forward or return path of the transport fiber. In the specific example shown a respective optical fiber amplifier 57 and 58 is added into the forward and return paths respectively of the transport fiber i.e. a respective fiber amplifier 57 is included in series with the forward fiber 32 and another respective fiber amplifier 59 is included in series with the return fiber 26. In the example shown the amplifiers are positioned at the far end of the transport fiber(s) path in front of the sensing fiber in the outward direction. This is because this is the position at which the outward sensing pulses are weakest after having traversed the entire length of the outbound transport fiber path, and hence amplification here to bring the pulses back up to, or closer to, or exceeding their original amplitudes and power has the most effect. For the backscattered signal, it is beneficial to minimize noise to position the amplifier close to the point of signal generation, as shown in the example. To drive the amplifiers doped fiber pump sources 52 and 54 are respectively provided, with pump source 52 being multiplexed onto the forward transport fiber 24 via wavelength division multiplexer 56, and with pump source 54 being multiplexed onto the return transport fiber 26 via wavelength division multiplexer 58.

In one example the optical fiber amplifiers may be erbium doped fiber amplifiers, which are pumped by the pump sources 54 and 56 at 1480 nm, and amplify light at the sensing pulse wavelength of 1550 nm, and thereby act to amplify the sensing pulses on the forward path to the sensing fiber, and the backscatter and reflections on the return path back to the interrogator. It is expected that the powers from each of the pumped lasers sources can be controlled and optimised independently, as is required to optimally amplify the sensing pulses on the forward transport path and the weaker quasi-continuous reflected light on the return transport path.

The doped fibre properties may also be different for the forward and return light paths; for example the doped fiber amplifiers may have different lengths. Also, a WDM and mirror may be placed after the doped fibre such that any pump light passing through the doped fibre is reflected back and so acts to increase the doped fibre pumping, as described later.

The operation of the FIG. 5 embodiment is the same as the previously described embodiments, but with the forward and return paths along the transport fiber(s) amplified by the fiber amplifiers. This helps to maintain the forward pulse and return signal levels, and hence improve the signal to noise ratio.

Figure 6:
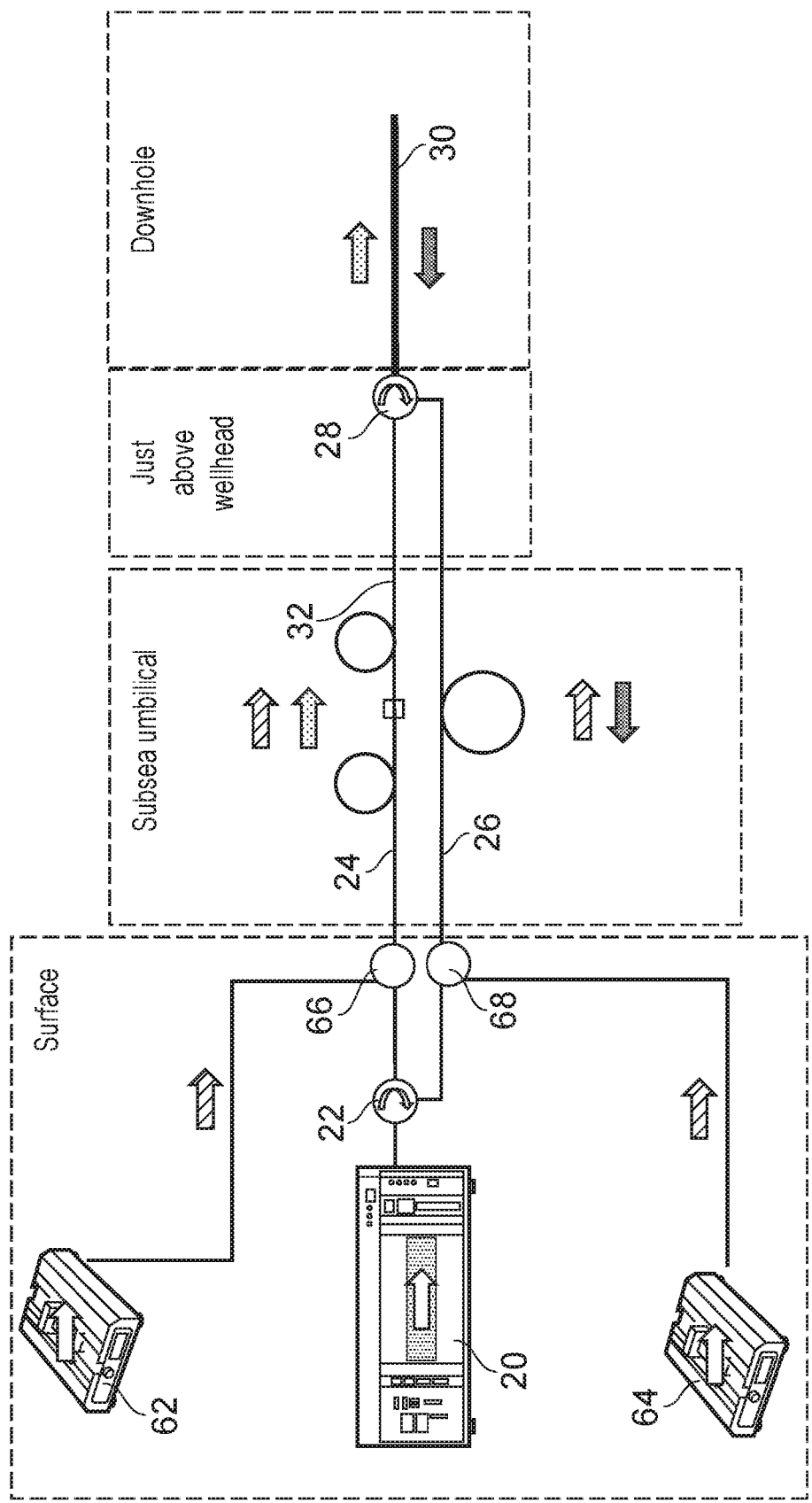
FIG. 6 is a diagram of a fourth example of the present disclosure.

FIG. 6 shows the next example. This builds upon the FIGS. 3 and 4 embodiments described previously, but adds in at least one Raman pump source on at least one of the forward and/or return transport fiber paths. In the particular example of FIG. 6 a respective Raman pump source 62 or 64 is provided on each of the outbound and return paths of the transport fiber(s), multiplexed onto the outbound or return paths as appropriate by a respective wavelength division multiplexer 66 or 68. The Raman pump sources operate at near 1455 nm, which is a suitable pump wavelength to then obtain Raman amplification at the preferred sensing pulse wavelength of 1550 nm. Note that, although the reflected light should be amplified with a continuous wave (CW) source, it is possible to use a pulsed source for the outward pump light, such that the pump pulse and sensing pulse co-propagate. This has the advantage of reducing total optical power for laser safety and optical damage considerations.

Figure 9:
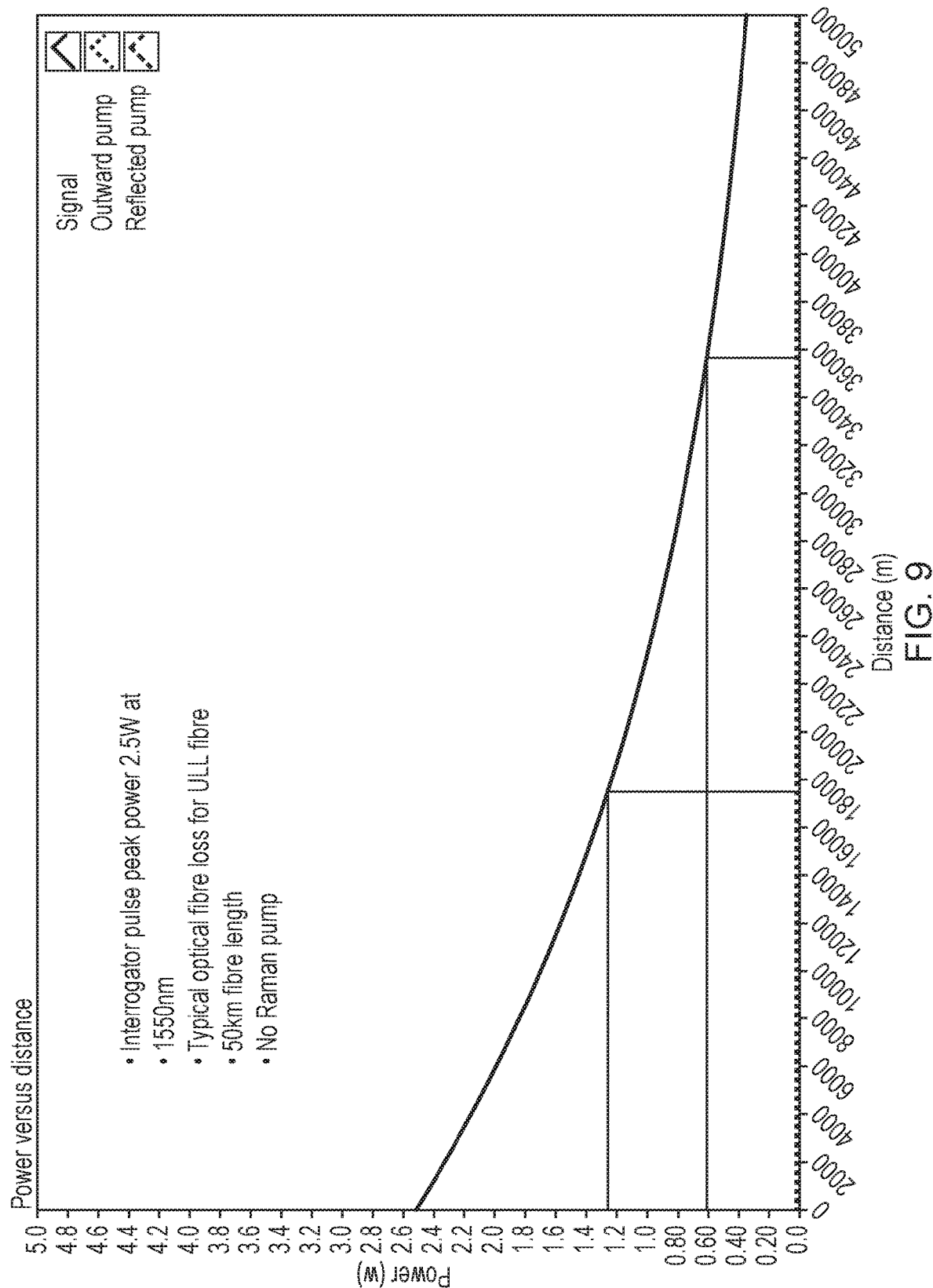
FIGS. 9 to 13 are graphs showing how the power in the fiber changes in the different examples.
Figure 10:
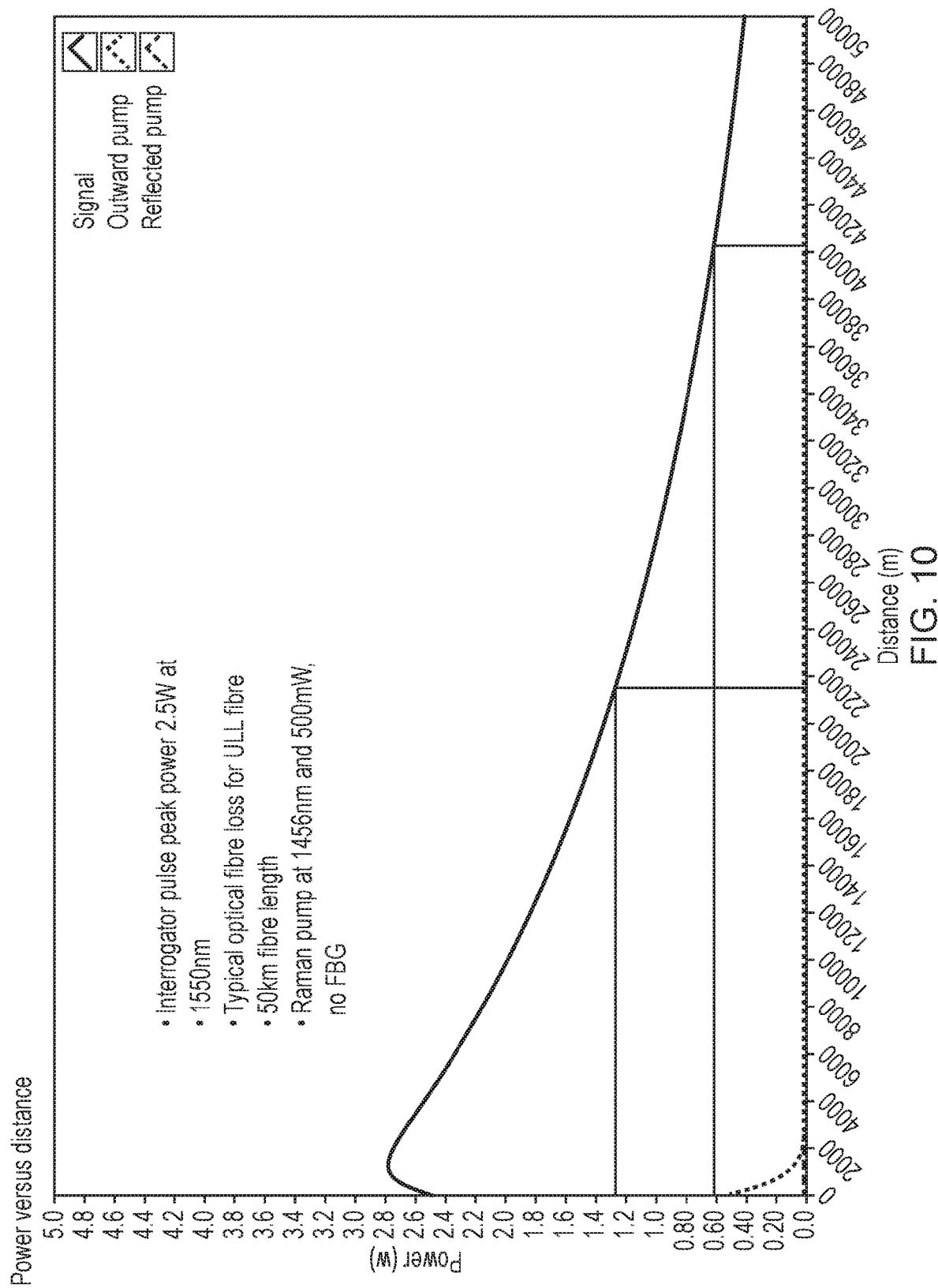

The effect of Raman amplification as shown in FIG. 6 is shown by considering FIGS. 9 and 10 together. FIG. 9 illustrates the instantaneous power in a sensing pulse as it propagates along the transport fiber to the sensing fiber, assuming an initial instantaneous peak power on first pulse injection onto the fiber of 2.5 W. As can be seen, as the pulse propagates along the outward transport fiber it suffers losses, such that half the power (−3 dB) is lost by approximately 17.5 km from the interrogator, and then a further half of the available power (−6 dB) by approximately 35.5 km from the interrogator.

FIG. 10 next shows the instantaneous pulse power of sensing pulses travelling along the transport fiber with Raman amplification, specifically using a 500 mW Raman pulse at 1456 nm, interacting with a 2.5 W peak power sensing pulse at 1550 nm. In this case as the sensing pulse power is already significantly larger than the Raman pulse power then the available pump light is very quickly used up and the power in the Raman pulse absorbed into the sensing pulse within the first 2000 m or so. However, that has the effect of boosting the signal pulse power to above that of originally injected, from ~2.5 W to ~2.8 W, at ~2000 m out. The pulse power then decays from that point as it propagates along the transport fiber, but the half power (−3 dB) point is extended out to ~21.5 km i.e. by about 4 km, and the next half power (quarter power) point (−6 dB) is then even further out at ~41000 m. Hence, using Raman amplification of the forward pulse in this manner extends the range and possible length of the transport fiber, by about 15%.

In some examples that make use of Raman pump amplification, some provision may need to be made to prevent unused pump light from entering the wellhead connector assembly, specifically to prevent high powers entering the wellhead connector assembly. In particular, in order to prevent overloading optical componentry in the wellhead it may be necessary to prevent the entry of the high power pump light used either as the Raman pump or to stimulate the erbium doped fibre; this light is a different wavelength from the actual optical sensing pulses themselves.

Figure 18:
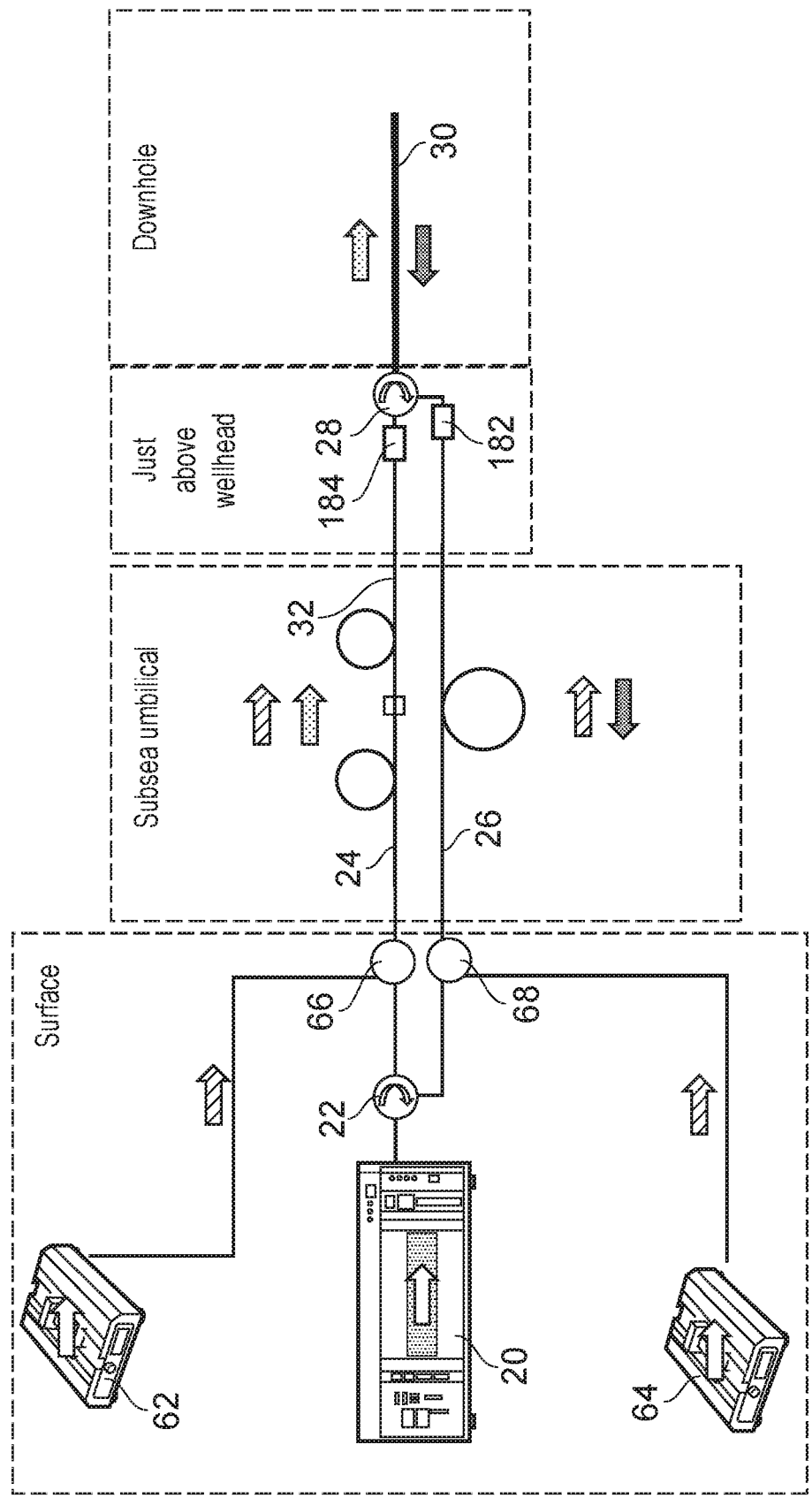
FIG. 18 is a diagram of a seventh example of the present disclosure showing a further modification that can be used with any of the examples of FIG. 6, 7, or 8 provided with Raman amplification.

One way to do this is shown in the example of FIG. 18, which is the same arrangement as shown in FIG. 6, but which adds in filters 184 and 182 in the transport fiber forward and return paths in order to absorb the Raman pump light. The filters 184 and 182 have a wavelength characteristic such that the filters' respective stop bands are at and around the Raman pump wavelength. Such filters should be placed just above the wellhead, so allowing amplification along the umbilical (transport fiber) but not letting the Raman pump light enter the wellhead connector. Referring to FIG. 18, filters 184 and 182 respectively are provided at the two umbilical inputs (i.e. transport fiber forward path 32 and return path 26) to the circulator 28 at the wellhead. Note, strictly, we do not need the return path filter 182 at the return transport fiber path connection to the circulator 28, as the circulator itself prevents Raman pump light going from the return umbilical fibre 26 to the wellhead (it operates to route unused Raman pump light back down the forward transport fiber 32), but providing a suitable high-power filter 182 here operates to protect the circulator from damage, in addition to the downhole components downstream of the circulator. The forward path transport fiber 32 should, in this example, always have the filter 182 to filter out unused Raman pump light from entering the optical circulator 28, however, as the arrangement of the optical circulator is such that any such unused Raman pump light will then be directed onto the sensing fiber downhole and may overload any other optical components.

Note that the optical filters 184 and 182, and at least the optical filter 184 in the forward path to the optical circulator, may be used in any of the examples described herein as a precaution to protect the optical circulator 32 and downhole componentry, even if not explicitly described in each example.

Figure 7:
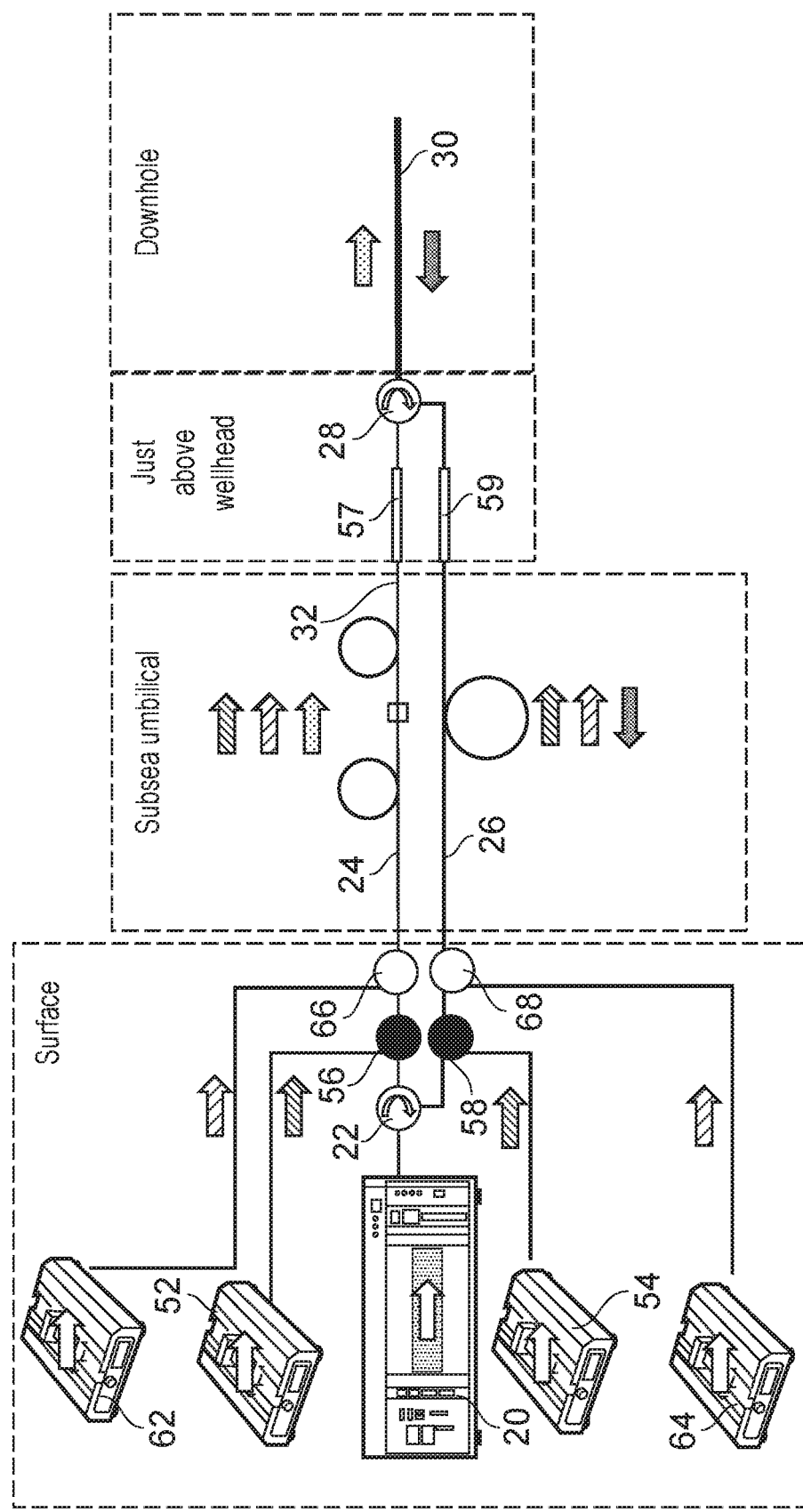
FIG. 7 is a diagram of a fifth example of the present disclosure.

The next example of FIG. 7 combines together the examples of FIGS. 5 and 6, such that both Raman amplification and optical fiber amplification of the outward sensing pulse and the pseudo-continuous backscatter and reflections is performed, to provide extended range and increased signal to noise ratio. Moreover, various modifications can be made to such an arrangement. For example, instead of using separate pump lasers for forward and return paths in the transport fiber, only one of each of the pump sources may be used, with the light sent to the two paths using couplers, and the power controlled independently for each path using attenuators. Using such a scheme, it would also be possible to use a single WDM (of appropriate wavelength selection) rather than two WDMs per path.

In addition, it is also possible to use a single wavelength pump source to achieve both Raman and doped fibre gain. For example, 1455 nm wavelength achieves both functions though is not optimum for optical fiber amplifier (specifically erbium doped fiber amplifier (EDFA) gain).

As a further modification, the performance of the amplification system may be further improved by ensuring polarisation diversity in the pumping arrangement.

In addition, for shorter ranges, or where lower SNR is acceptable, the various elements of the system can be independently removed as desired. For example, for ranges of ~25 km, it may be desired not to use the doped fibre amplification option.

Moreover, if electrical power is available at the wellhead, it is possible to position the doped fibre pump lasers at the wellhead. This allows more light to pump the doped fibre as the pump light is not then subject to the transport fiber loss.

In addition, as described previously with respect to FIG. 18, in some examples it can be beneficial to prevent unused Raman pump light from transiting the optical circulator 28 and entering the sensing fiber 30. Whilst as described previously this can be undertaken by the inclusion of optical filters with a stop band specifically at the Raman pump wavelength inserted in the forward and return transport fibers, in another example the doped fiber amplifiers 57 and 59 can be used to absorb the Raman pump light instead, and thereby stop it transiting the circulator 28. Specifically, it is possible to design the doped fibre amplifiers 57 and 59 such that they will absorb the Raman pump light, to thereby prevent it entering the wellhead. To achieve this effect the doped fibre should be chosen with a dopant concentration and length such that it will substantially absorb the Raman pump light so as to prevent it entering the wellhead.

With respect to the design and properties of the fiber amplifiers 57 and 59 to achieve the above effect i.e. to absorb the Raman pump light whilst still amplifying the forward optical signal pulses, there are many ways that the fiber amplifier can be configured to achieve the desired wavelength selectivity, by appropriate selection of glass host (i.e. which glass the fiber amplifier is formed from), and dopant concentration profile along the length of the fiber amplifier, as well as the inclusion of appropriately tuned Bragg gratings, if necessary, to enhance wavelength rejection, for example at the Raman pump wavelength. Such techniques for the precise wavelength tuning of erbium doped fiber amplifiers to give a desired optical wavelength pass band characteristic are well known in the art, and hence may be employed to give the desired wavelength characteristic for the amplifiers 57 and 59 i.e. to provide for amplification of the optical signal sensing pulses provided by the DAS interrogator 20, but to suppress and/or reject the Raman pump light at the Raman amplification wavelength generated by the Raman pump sources 62 and 64.

Figure 8:
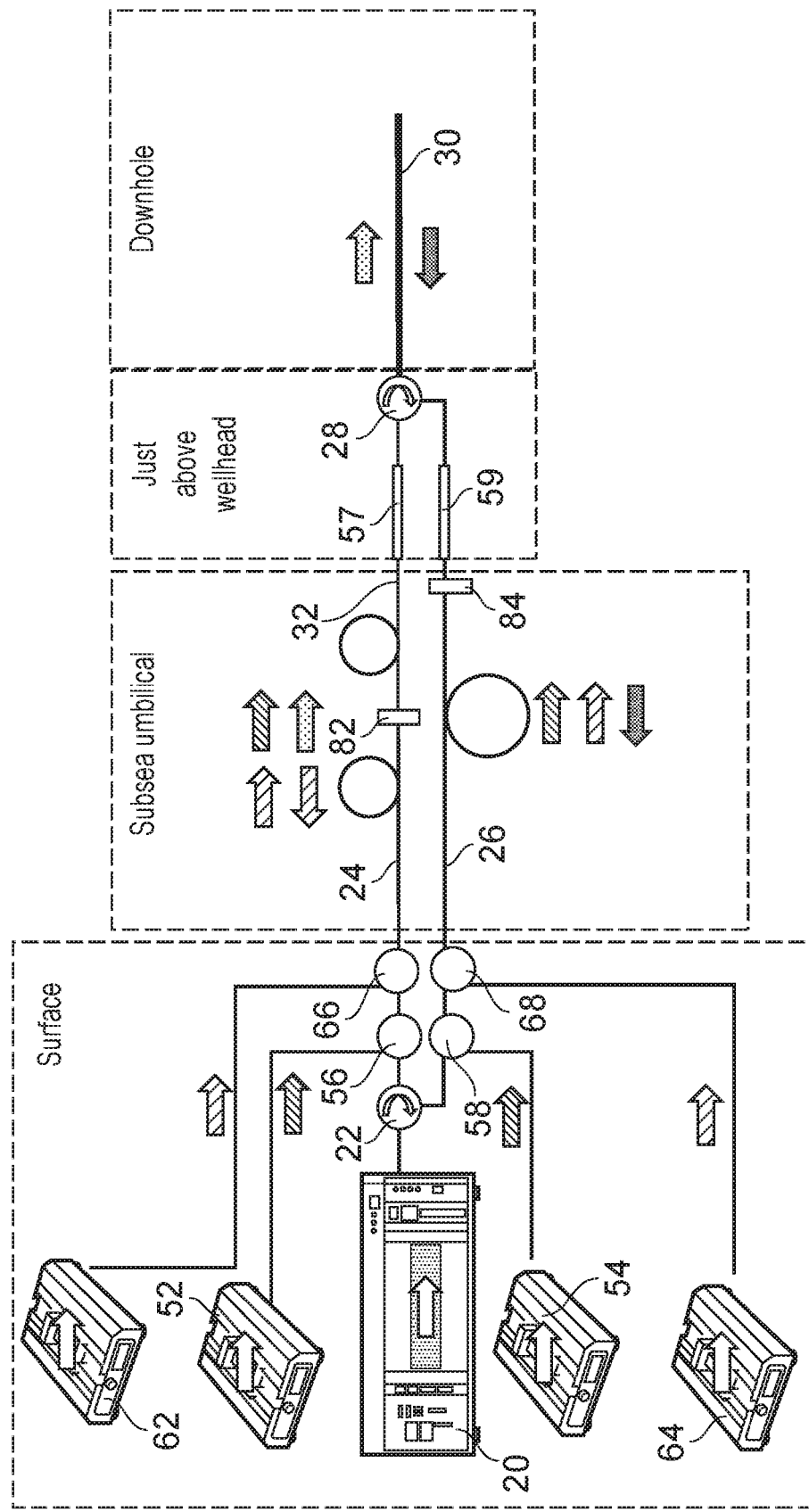
FIG. 8 is a diagram of a sixth example of the present disclosure.

Turning now to FIG. 8, a further example is shown. This example is based on the example of FIG. 7, and includes both Raman amplification of the forward sensing pulse and the pseudo-continuous backscatter and reflections, and optical fiber amplification of the same. However, in addition, in order to improve the Raman amplification that is obtained, two wavelength selective reflectors that reflect at the Raman pump wavelength but not at the sensing pulse wavelength, nor the optical fiber amplifier pump wavelength, are included, one in each of the forward path and return path of the transport fiber(s). In particular, in this example in the forward path a reflective grating 82 such as a Fiber Bragg Grating (FBG) is placed at the junction of the high power fiber 24 and the ULL fiber 32. In the return path a similar grating 84 is included at the far end of the transport fiber from the interrogator i.e. just before the optical fiber amplifier 59 positioned just in front of the sensing fiber 30. The effect of the inclusion of these reflective gratings is as follows.

As described above with respect to FIG. 10, the forward going Raman amplification (amplification of the sensing pulse) does not give much gain due to rapid pump depletion—it only gives a small gain of a few dB in our implementation. The backward (backscatter and reflection) Raman amplification does indeed give significant gain, however. The reason for this is that Raman amplification is usually used when the signal (here the sensing pulse) power is much lower than the Raman pump power. With the backscatter light, this is indeed the case as the returning light is much less than 1 mW, whereas the Raman pump light is around 500 mW. This allows the pseudo continuous backscatter and reflection signal light to grow appreciably without drawing significant power from the pump signal (which causes pump depletion). For example, neglecting losses, if the pseudo continuous back scatter and reflection signal starts at 10 uW and the Raman pump signal at 500 mW, then, through conservation of energy, it is possible for the signal to grow 50,000× before the pump is exhausted (though note in practice the gain will be much lower).

However, with a DAS, although the average launched power can also be low, in or below the mW range, the power inside an individual pulse is much higher and typically in the range of a few W, and so of the same order of magnitude as the pump. This means that as the Raman pump and sensing pulse co-propagate in the forward direction along the transport fiber, power is rapidly drawn from the Raman pump to the sensing pulse, causing significant Raman pump depletion. From conservation of energy, it is not possible for the signal power of the sensing pulse to gain more power than is in the Raman pump signal, and so the amount of available gain is very limited. For example, if the sensing pulse starts at 2.5 W and the Raman pump at 0.5 W, the maximum the sensing pulse can grow to is just 3 W (ignoring any losses)—a modest increase.

There is a small additional gain from wavelength dispersion, such that the sensing pulse benefits from extracting energy from a fresh portion of the pump light due to pump and sensing pulse wavelength "walk off". In practice though, this benefit will be very small. For example, between a sensing pulse at 1550 nm and a pump pulse at 1456 nm, the dispersion will be around 1.5 ns/km. This means, over say 50 km of fibre, the sensing pulse can extract energy from an extra 75 ns of pump light in addition to the initial pulse width of around 50 ns. Although useful, this will not make a significant difference to the ultimate performance.

In order to resolve this, by efficiently amplifying the outward light, we place an FBG reflector 82 (or a WDM and mirror) at some point along the outward transport fiber which reflects the Raman pump light but passes through the sensing pulse light. This then gives the same amplification principle as the backscatter case above: now the Raman pump light counter propagates against the sensing pulse such that the sensing pulse is always passing through a fresh portion of Raman pump signal, meaning that Raman pump depletion is negligible. In this way, a significant amplification is achievable. Note, the outward sensing pulse would still also get the small benefit it currently receives from co-propagating with the Raman pulses, as described previously with respect to FIG. 10.

The FBG 82 could be located at a convenient place, such as at an umbilical termination assembly (where lengths of umbilicals join), at the wellhead, or could be written into the umbilical transport fibre itself. The use of a pump wavelength reflector also provides a protection for the wellhead wet-mat connector as it cuts off the pump power reaching the connector termination end, thus avoiding potential connector damage. Our modelling indicates, for the powers we use, the FBG would optimally be placed within around 25 km to 35 km (optimum value dependent on fibre losses and pump power) from the interrogator. So, for example with a transport fiber 75 km long, it would be beneficial to have the FBG at 25 km-35 km rather than at the end of the transport. This is because we need sufficient energy in the Raman pump to amplify the sensing pulse.

In another embodiment, there could be a series of weak FBGs, rather than just one, with the reflectivities tuned along the length to maximise power delivery at the far end. There is also a smaller benefit in similarly having an FBG reflector in the backscatter path (as also shown in FIG. 8). Here the advantage is to recycle pump light which would otherwise exit the fibre and be lost. Alternatively, WDMs could be used to recycle the forward path pump into the return path and vice versa.

Figure 11:
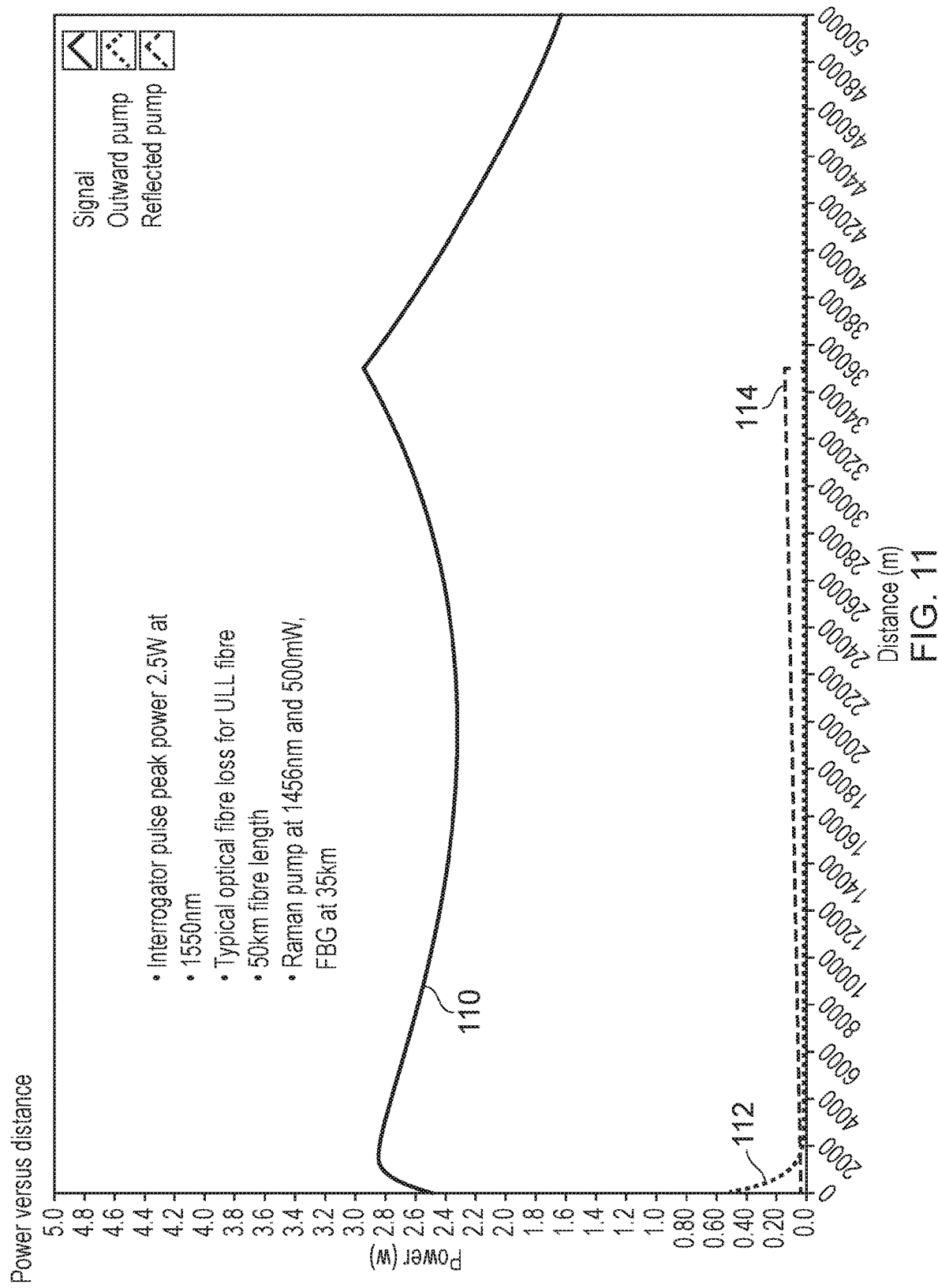
Figure 12:
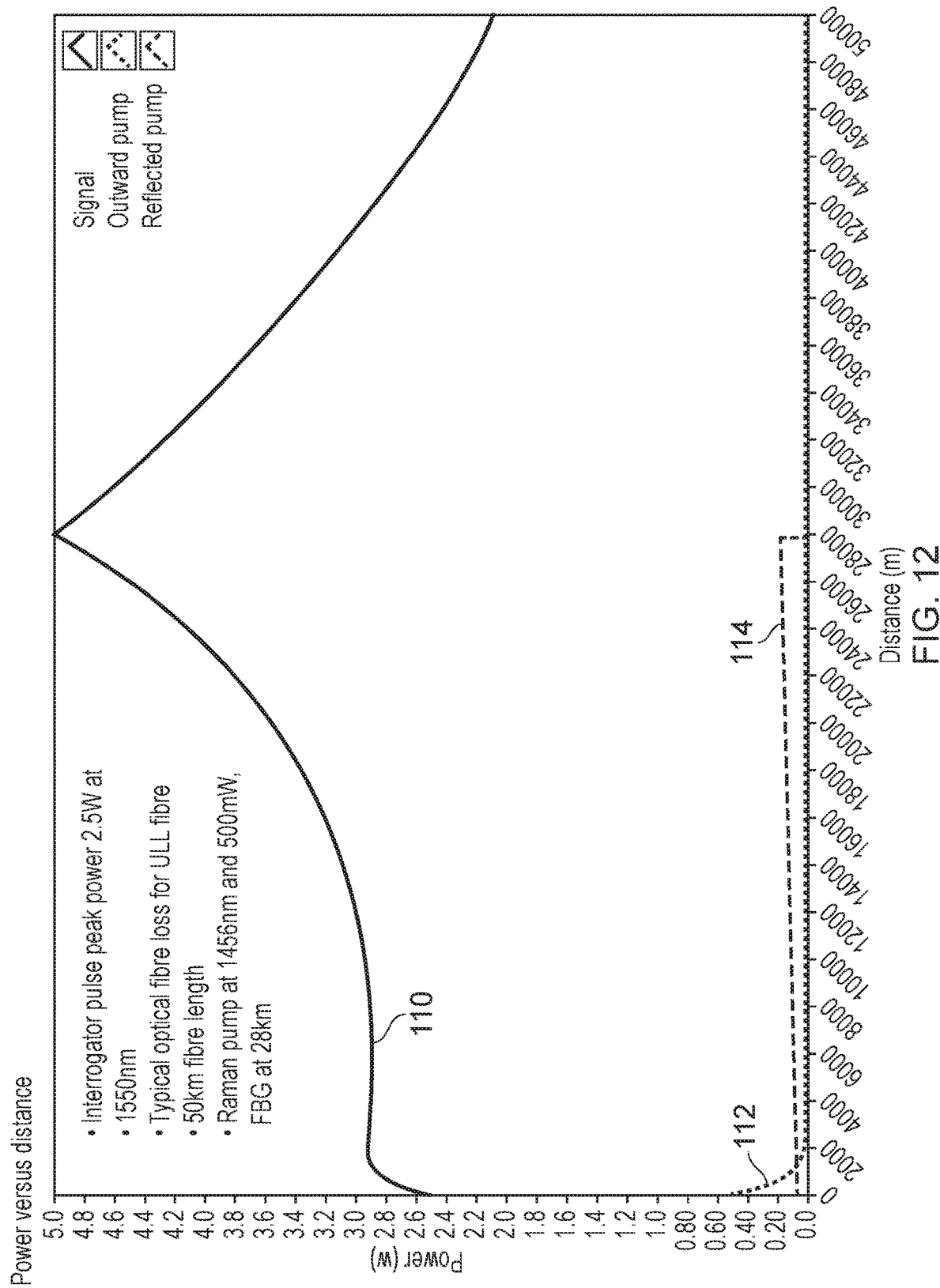
Figure 13:
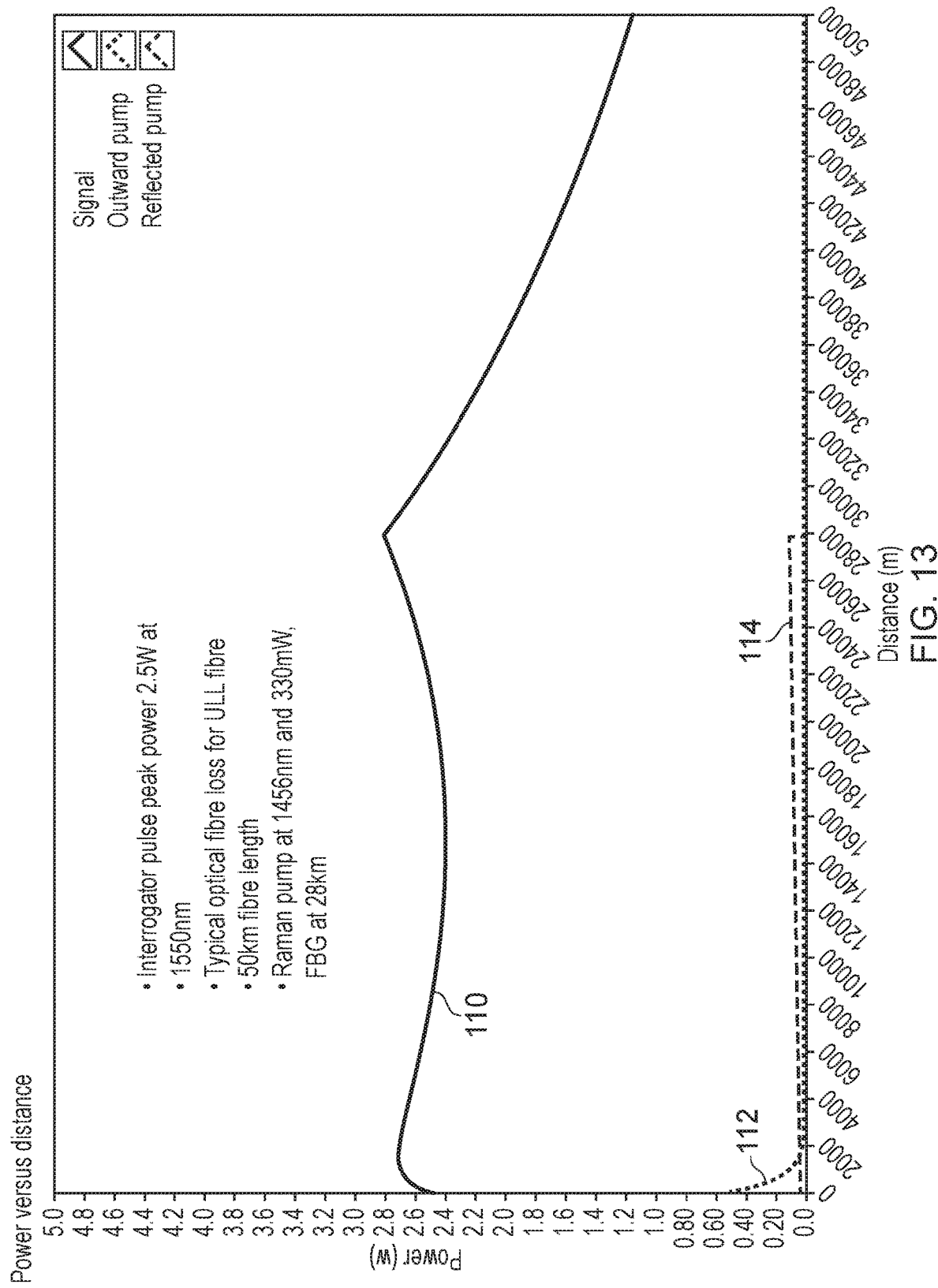

FIGS. 11, 12, and 13 illustrate the effects of using the FBG 82 in the forward path of the transport fiber. Looking first at FIG. 11, here the FBG 82 is included in the forward path of the transport fiber at 35 km from the interrogator, and a continuous wave Raman pump of 500 mW is used. As can be seen from the red line (112), as described previously, the section of forward pump light which co-propagates with the sensing pulse is absorbed by the forward co-propagating sensing pulse very rapidly, within the first 2 km or so, and this has the effect of raising the instantaneous power of the sensing pulse by approximately the same amount (in practice slightly less due to practical losses). The far larger section of pump light which does not co-propagate with the sensing pulse (equivalent to the entire fibre length up to the reflector of 35 km, minus the sensing pulse width of around 5 m) is not absorbed and so propagates all the way to the FBG 82, and this is then reflected back. At this point the near continuous reflected Raman pump light (continuous excepting the small ~5 m section depleted by the sensing pulse) counter propagates against the next sensing pulse(s), such that it presents at the Raman stimulation wavelength a "fresh" ie undepleted pump light which can be used to stimulate emission at the sensing pulse wavelength. Note that there is minimal depletion of this reflected pump light even in the case of there being multiple sensing pulses propagating in the transmission fiber. This is because the average sensing pulse power is of the order of mW, or below, whereas the pump optical energy is much larger and of the order of 100 s of mW. This is in contrast to the co-propagating condition where it is the peak sensing pulse power (in the W range) which is relevant in calculating depletion rather than the average sensing pulse power (in the mW range). The effect of this counter propagating pump light substantially maintains the instantaneous power of the sensing pulse, as shown by curve 110 in FIG. 11.

FIG. 12 shows the same simulation as FIG. 11, but with the difference that the FBG 82 is brought further back along the forward path of the transport fiber towards the interrogator, and hence is only at 28 km, but of the same power, 500 mW. The effect of this is that the reflected counter propagating Raman pump light is even stronger, and hence stimulates a stronger emission at the sensing pulse wavelength, such that the instantaneous power of the sensing pulse increases substantially up to the location of the grating 82. In fact, the stimulated emission as a result of the counter-propagating Raman pump light in this case is so strong that the sensing pulse probably enters the non-linear propagation region where non-linear power effects occur. Therefore, in order to address this issue, the power of the pump light can be reduced, as shown in FIG. 13. Here, a 330 mW pump is used with a reflector at 28 km, and the power of the sensing pulse is maintained within the linear propagation region of 2.5 W or less.

The important point of the results shown in FIGS. 11 and 13, however, are to compare the instantaneous sensing pulse power at the end of transport fiber 50 km from the interrogator with the case shown in FIG. 9, where no Raman stimulation is used. In FIG. 9, at 50 km the signal power has dropped from 2.5 W to about 0.4 W. In contrast, within FIGS. 11 and 13, at 50 km the signal power is in the range 1.4 to 1.6 W, and hence still retains much of its original power, and certainly enough to be of use in the sensing fiber. The use of the counter propagating Raman pump amplification therefore helps to maintain the power in the sensing pulses as they travel along the transport fiber, and prevents them from becoming too depleted so as to be of much use in generating backscatter and reflections in the sensing fiber.

Figure 14:
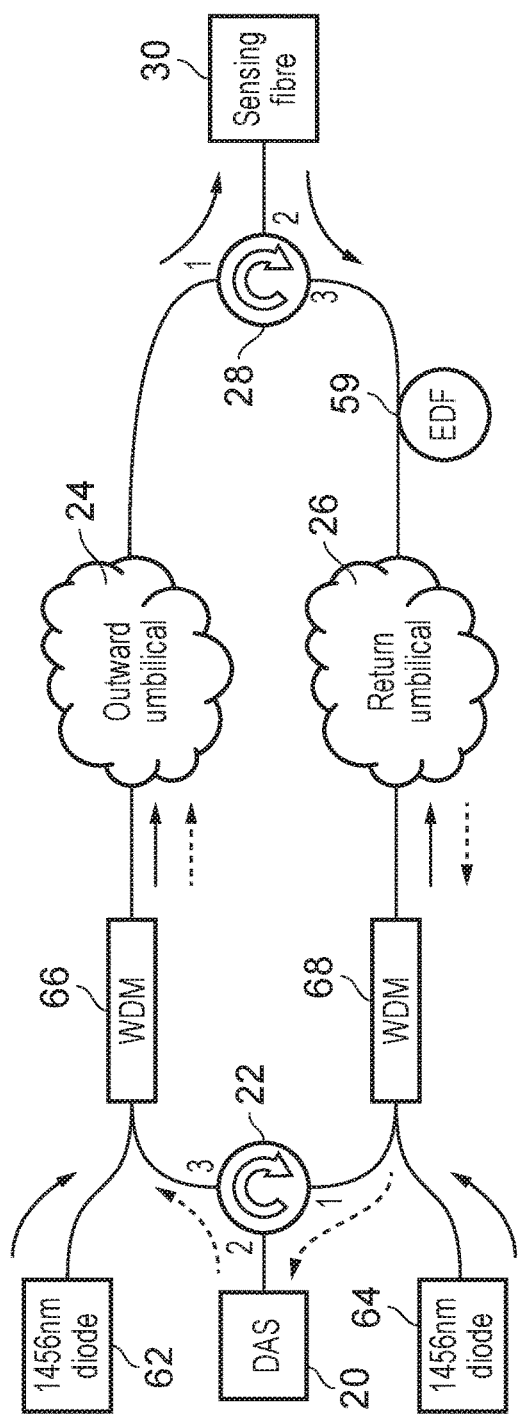
FIG. 14 is a diagram illustrating a first modification that may be made to examples of the present disclosure.
Figure 15:
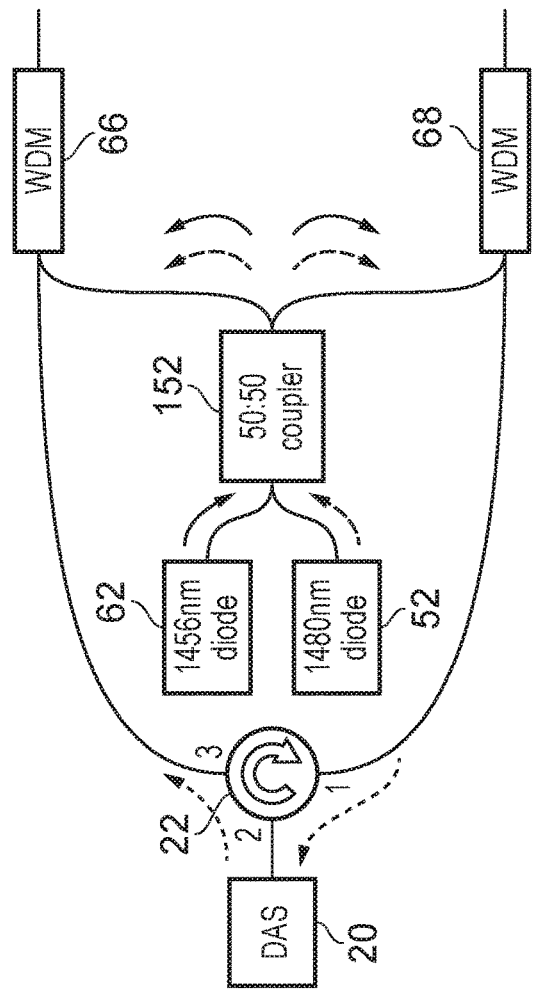

FIGS. 14 to 17 shows various further modifications to the above described examples that can be made to provide further examples. For example, FIG. 14 presents a stylised view of the example of FIG. 6, where Raman amplification is provided by way of two Raman pump sources 62 and 64. FIG. 15 then shows a modification to the arrangement, in which a single Raman pump source 62 and a single optical fiber amplifier pump source 52 64 are both coupled into the optical circuit via a 50:50 coupler 152 and two wavelength division multiplexers 66 and 68, as shown. That is WDM 66 is provided in the forward transport fiber path, and WDM 68 is provided in the return transport fiber path, and the respective outputs of 50:50 coupler 152 are connected to the respective Raman pump source 62 and optical fiber amplifier pump source 52. This has the consequence of each of the single pump sources operating at different wavelengths to feed both of the forward and return transport fiber paths simultaneously, from a single source of each wavelength. As such, the component count of such an arrangement is reduced. In these configurations, the amount of pump light of each wavelength launched into each of the transmission and return paths can be tuned through the use of a coupler with a different split ratio and/or through the addition of attenuators.

Figure 16:
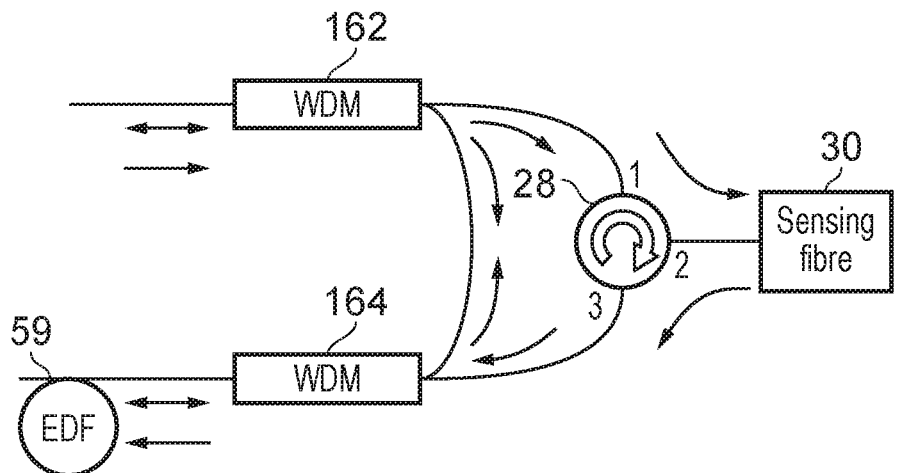
FIG. 16 is a diagram illustrating a second modification that may be made to examples of the present disclosure.
Figure 17:
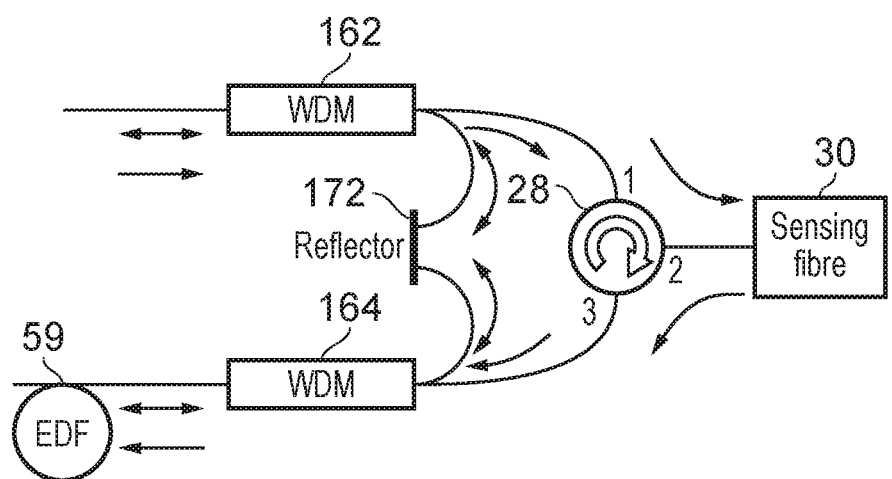
FIG. 17 is a diagram illustrating a fourth modification that may be made to examples of the present disclosure.

FIGS. 16 and 17 show two slightly different modifications that can be used to ensure that any unused Raman pump light is captured and fed back into the transport fibers. In FIG. 16 a pair of wavelength division multiplexers which discriminate the Raman pulse from the sensing pulse are provided at the far end of the transport fibers from the interrogator, in front of circulator 28. Specifically WDM 162 is provided in the forward path of the transport fiber, and WDM 164 in the return path. These WDMs then have the effect of directing Raman light that is propagating along the forward path of the transport fiber onto the return path, and vice versa ie directing Raman light that has propagated to the end of the return path (counter propagating against the returning back scatter and reflections from the sensing fiber) into the forward path so as to counter propagate against the forward sensing pulses.

FIG. 17 shows a similar arrangement, but here a reflector 172 is provided to which the WDMs 162 and 164 direct the Raman light. The Raman light is then reflected back down the same path (ie forward or return transport fiber path) down which it originally propagated. The same advantage as FIG. 16 is obtained, in that no Raman pump light is allowed to escape into the sensing fiber and go unused.

Various further modifications to the above described examples, whether by way of addition, deletion or substitution, will be apparent to the skilled person to provide additional examples, any and all of which are intended to be encompassed by the appended claims.

The invention claimed is:

1. A long range optical fiber distributed sensor system, comprising:
   an optical source arranged in use to produce optical sensing pulses;
   a sensing optical fiber deployable in use in an environment to be sensed and arranged in use to receive the optical sensing pulses; and
   sensing apparatus arranged in use to detect light from the optical sensing pulses reflected and/or backscattered back along the sensing optical fiber and to determine any one or more of an acoustic, vibration, temperature or other parameter that perturbs the path length of the sensing optical fiber in dependence on the reflected and/or backscattered light;
   the system being characterised by:
   at least one transport fiber arranged between the sensing optical fiber and the optical source to transport the optical sensing pulses from the optical source to the sensing fiber and to transport backscatter and/or reflections from along the sensing fiber back to the sensing apparatus;
   at least one optical fiber amplifier arranged in series with the transport fiber between the transport fiber and the sensing optical fiber, and;
   an optical fiber amplifier pump source arranged to provide pump light to the optical fiber amplifier, the optical fiber amplifier arranged in use to amplify at least one of:
   i) the forward optical sensing pulses; or
   ii) the forward optical sensing pulses and the returning backscatter and/or reflections.

2. A long-range optical fiber sensor according to claim 1, wherein the transport fiber comprises a forward transport fiber arranged to convey optical sensing pulses from the optical source to the sensing optical fiber, and a return transport fiber arranged to convey back scatter and/or reflections from the sensing optical fiber back to the interrogator.

3. A long range optical fiber sensor according to claim 2, wherein a separate optical fiber amplifier is provided on each of the forward and return transport fibers.

4. A long range optical fiber sensor according to claim 3, wherein a respective optical fiber amplifier pump source is provided for the respective optical fiber amplifiers, wherein the pump source for the optical fiber amplifier on the return transport fiber provides a continuous wave pump signal, whereas the pump source for the optical fiber amplifier on the forward transport fiber provides a pulsed pump signal that co-propagates with the forward optical sensing pulses.

* * * * *